US009128520B2

(12) United States Patent
Geisner et al.

(10) Patent No.: US 9,128,520 B2
(45) Date of Patent: Sep. 8, 2015

(54) SERVICE PROVISION USING PERSONAL AUDIO/VISUAL SYSTEM

(75) Inventors: Kevin A Geisner, Mercer Island, WA (US); Kathryn Stone Perez, Kirkland, WA (US); Stephen G. Latta, Seattle, WA (US); Ben J Sugden, Woodinville, WA (US); Benjamin I Vaught, Seattle, WA (US); Jeffrey B Cole, Seattle, WA (US); Alex Aben-Athar Kipman, Redmond, WA (US); Ian D McIntyre, Redmond, WA (US); Daniel McCulloch, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 566 days.

(21) Appl. No.: 13/436,511

(22) Filed: Mar. 30, 2012

(65) Prior Publication Data

US 2013/0083063 A1    Apr. 4, 2013

Related U.S. Application Data

(63) Continuation-in-part of application No. 13/250,878, filed on Sep. 30, 2011.

(51) Int. Cl.
*G06T 19/00* (2011.01)
*G06F 3/01* (2006.01)
(Continued)

(52) U.S. Cl.
CPC .............. *G06F 3/011* (2013.01); *G02B 27/017* (2013.01); *G06F 3/013* (2013.01); *G06T 19/006* (2013.01);
(Continued)

(58) Field of Classification Search
CPC .................................................... G06T 19/006

USPC .......................................................... 345/419
See application file for complete search history.

(56) References Cited

U.S. PATENT DOCUMENTS 6,191,892 B1    2/2001  Isaka et al.
7,693,702 B1    4/2010  Kerner et al.
(Continued)

FOREIGN PATENT DOCUMENTS

WO    WO 2005/124429 A1    12/2005
WO    WO 2011/126571 A1    10/2011

OTHER PUBLICATIONS

Response to Office Action dated May 2, 2014, U.S. Appl. No. 13/250,878, filed Sep. 30, 2011.
(Continued)

*Primary Examiner* — Kee M Tung
*Assistant Examiner* — Ryan M Gray
(74) *Attorney, Agent, or Firm* — Micah Goldsmith; Judy Yee; Micky Minhas

(57) ABSTRACT

A collaborative on-demand system allows a user of a head-mounted display device (HMDD) to obtain assistance with an activity from a qualified service provider. In a session, the user and service provider exchange camera-captured images and augmented reality images. A gaze-detection capability of the HMDD allows the user to mark areas of interest in a scene. The service provider can similarly mark areas of the scene, as well as provide camera-captured images of the service provider's hand or arm pointing to or touching an object of the scene. The service provider can also select an animation or text to be displayed on the HMDD. A server can match user requests with qualified service providers which meet parameters regarding fee, location, rating and other preferences. Or, service providers can review open requests and self-select appropriate requests, initiating contact with a user.

19 Claims, 19 Drawing Sheets

(51) Int. Cl.
*G09G 3/00* (2006.01)
*G09G 5/36* (2006.01)
*G02B 27/01* (2006.01)

(52) U.S. Cl.
CPC ............... *G09G 3/003* (2013.01); *G09G 5/363* (2013.01); *G02B 2027/014* (2013.01); *G02B 2027/0138* (2013.01); *G02B 2027/0187* (2013.01); *G09G 2340/14* (2013.01); *G09G 2340/145* (2013.01); *G09G 2360/02* (2013.01); *G09G 2370/022* (2013.01); *G09G 2370/16* (2013.01); *G09G 2380/00* (2013.01); *G09G 2380/10* (2013.01)

(56) References Cited

U.S. PATENT DOCUMENTS

| | | | |
|---|---|---|---|
| 7,714,895 B2 | 5/2010 | Pretlove et al. | |
| 7,715,037 B2* | 5/2010 | Castellani et al. | 358/1.15 |
| 7,873,911 B2 | 1/2011 | Gopalakrishnan | |
| 8,432,489 B2 | 4/2013 | Arseneau et al. | |
| 8,621,362 B2* | 12/2013 | Castellani et al. | 715/740 |
| 2002/0046368 A1* | 4/2002 | Friedrich et al. | 714/45 |
| 2002/0067372 A1* | 6/2002 | Friedrich et al. | 345/753 |
| 2002/0069072 A1* | 6/2002 | Friedrich et al. | 704/275 |
| 2002/0105482 A1 | 8/2002 | Lemelson et al. | |
| 2005/0113649 A1 | 5/2005 | Bergantino | |
| 2005/0289590 A1 | 12/2005 | Cheok | |
| 2007/0276270 A1 | 11/2007 | Tran | |
| 2008/0071559 A1 | 3/2008 | Arrasvuori | |
| 2008/0100570 A1* | 5/2008 | Friedrich et al. | 345/156 |
| 2009/0102859 A1 | 4/2009 | Athsani et al. | |
| 2009/0300122 A1 | 12/2009 | Freer | |
| 2010/0131865 A1 | 5/2010 | Ackley et al. | |
| 2010/0238161 A1 | 9/2010 | Varga et al. | |
| 2011/0112904 A1 | 5/2011 | Stupp | |
| 2011/0141009 A1* | 6/2011 | Izumi | 345/156 |
| 2011/0221656 A1 | 9/2011 | Haddick et al. | |
| 2011/0221793 A1 | 9/2011 | King, III et al. | |
| 2011/0270135 A1* | 11/2011 | Dooley et al. | 600/595 |
| 2011/0318717 A1 | 12/2011 | Adamowicz | |
| 2012/0005222 A1 | 1/2012 | Bhagwan et al. | |
| 2012/0072302 A1 | 3/2012 | Chen et al. | |
| 2012/0209826 A1* | 8/2012 | Belimpasakis | 707/710 |
| 2012/0233002 A1 | 9/2012 | Abujbara | |

OTHER PUBLICATIONS

Non-final Office Action dated May 21, 2014, U.S. Appl. No. 13/250,878, filed Sep. 30, 2011.
Notice of Allowance dated Jun. 20, 2014, U.S. Appl. No. 13/436,526, filed Mar. 30, 2012.
Response to Office Action dated Oct. 17, 2013, U.S. Appl. No. 13/250,878, filed Sep. 30, 2011.
Response to Office Action dated May 12, 2014, U.S. Appl. No. 13/436,526, filed Mar. 30, 2012.
Shetty, Chetan Kumar G., "Experinn E-Learning System", In Proceedings of the International Conference on Teaching, Learning and Change, International Association for Teaching and Learning, 2011, pp. 515-524.
Guennoun, et al., "Augmented Reality-Based Audio/Visual Surveillance System", In Proceedings of IEEE International Workshop on Haptic Audio Visual Environments and Games, Oct. 18-19, 2008, pp. 70-74.
Kaufmann, H., "Collaborative Augmented Reality in Education," Institute of Software Technology and Interactive Systems, Vienna Univ. of Technology, 2003, 4 pages.
Liu, P., et al., "Designing Real-Time Vision Based Augmented Reality Environments for 3D Collaborative Applications," Proceedings of the 2002 IEEE Canadian Conference on Electrical & Computer Engineering, Aug. 2002, 6 pages.
Zhong, X.W., "Collaborative Augmented Reality: A Prototype for Industrial Training," Proceedings of the 21st Biennial Symposium on Communications, 2002, 5 pages.
Regenbrecht, H., et al., "Augmented Reality Projects in Automotive and Aerospace Industry," IEEE Computer Graphics and Applications, Nov.-Dec. 2005, 14 pages.
Smailagic, A., et al., "Application Design for Wearable and Context-Aware Computers," IEEE Pervasive Computing, Oct.-Dec. 2002, 10 pages.
Final Office Action dated Feb. 4, 2014, U.S. Appl. No. 13/250,878, filed Sep. 30, 2011.
Non-final Office Action dated Feb. 11, 2014, U.S. Appl. No. 13/436,526, filed Mar. 30, 2012.
Non-final Office Action dated Jul. 26, 2013, U.S. Appl. No. 13/250,878, filed Sep. 30, 2011.
Final Office Action dated Nov. 21, 2014, U.S. Appl. No. 13/250,878, filed Sep. 30, 2011.

* cited by examiner

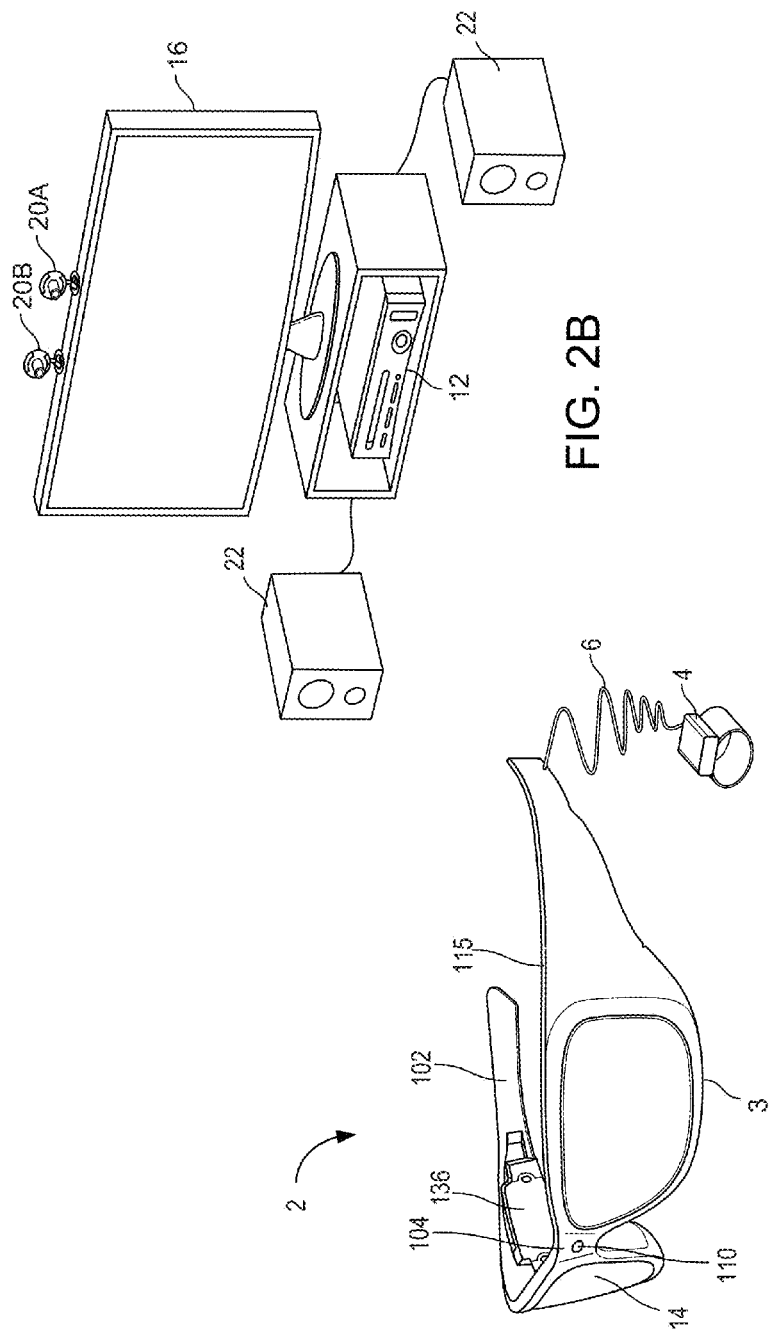

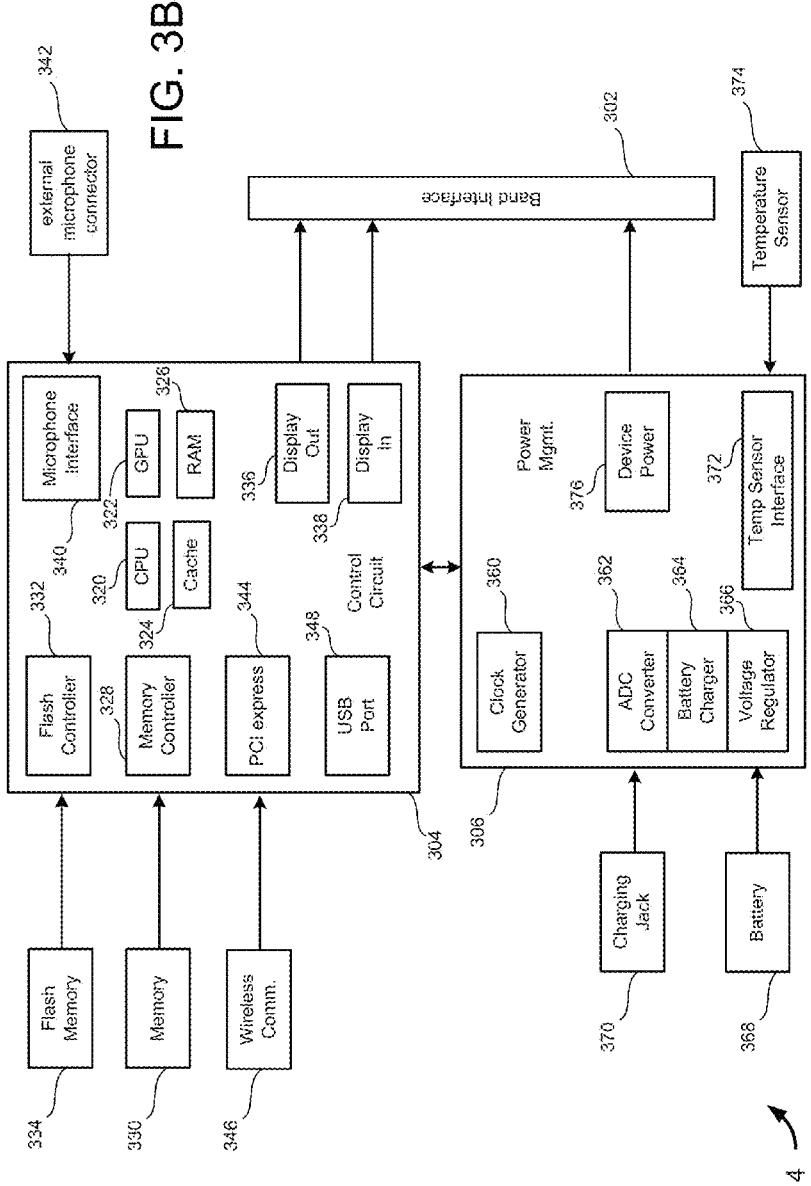

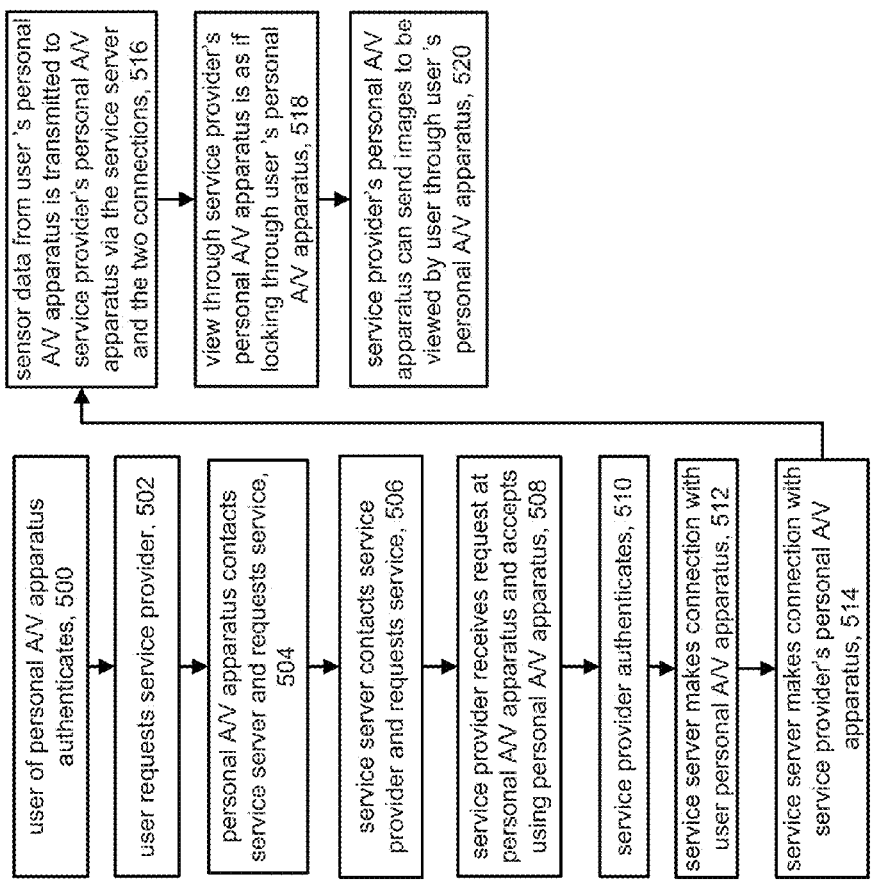

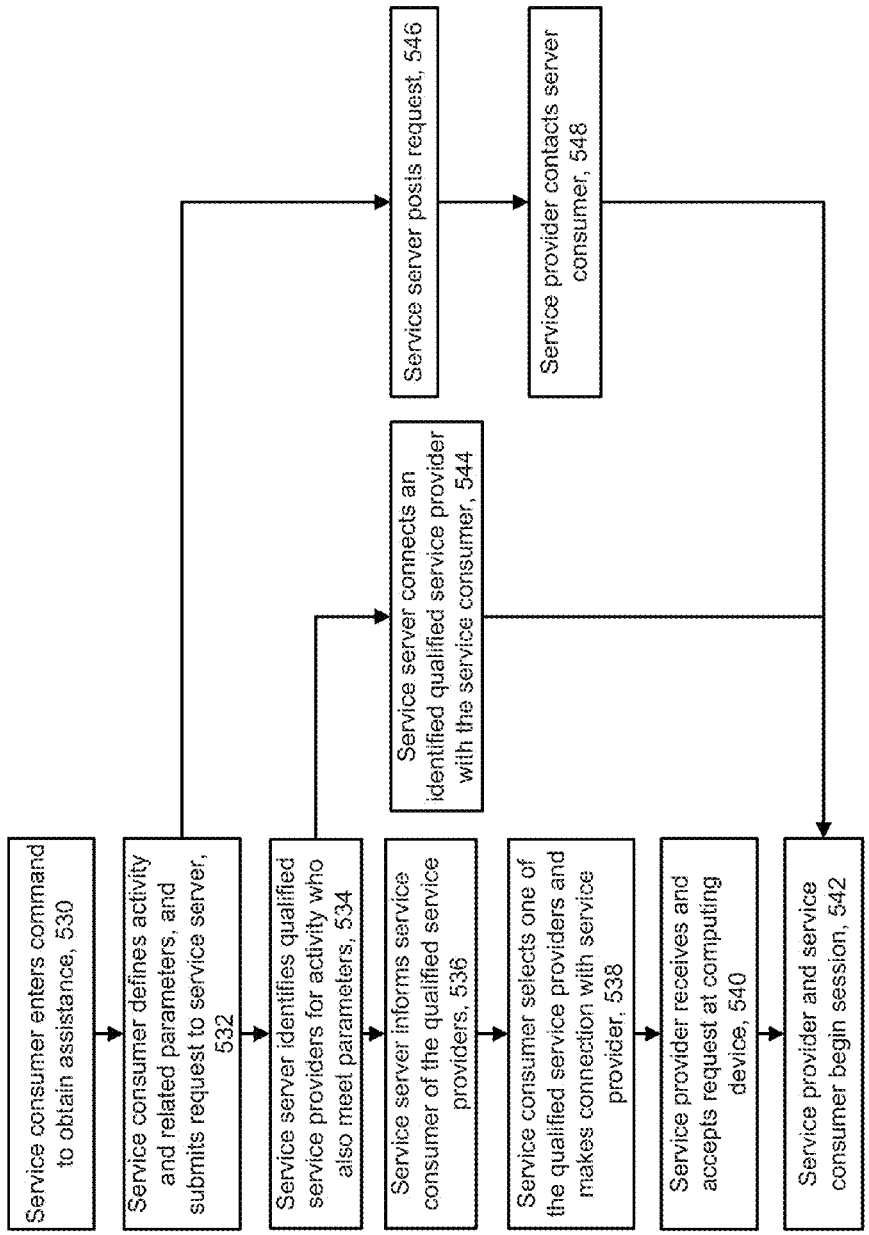

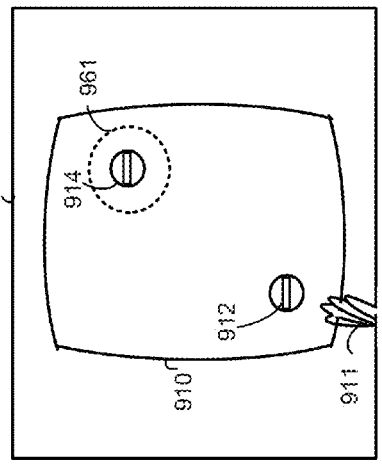
FIG. 9B
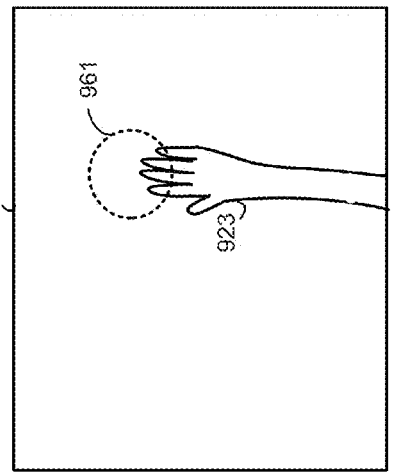
FIG. 9C
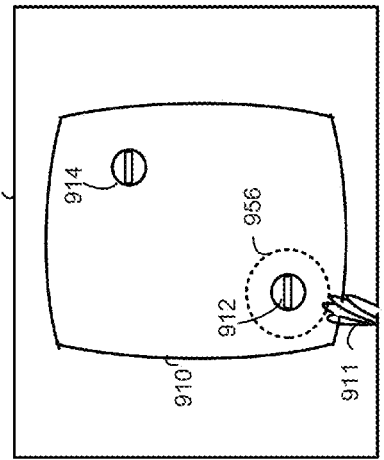
FIG. 9D1
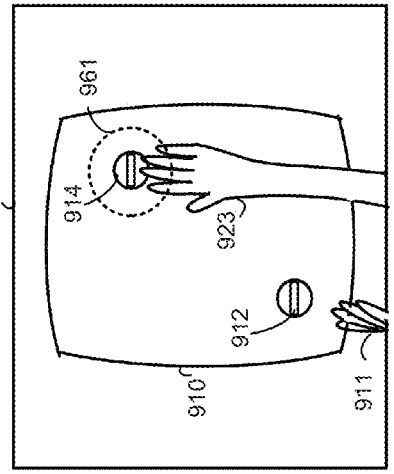
FIG. 9D2

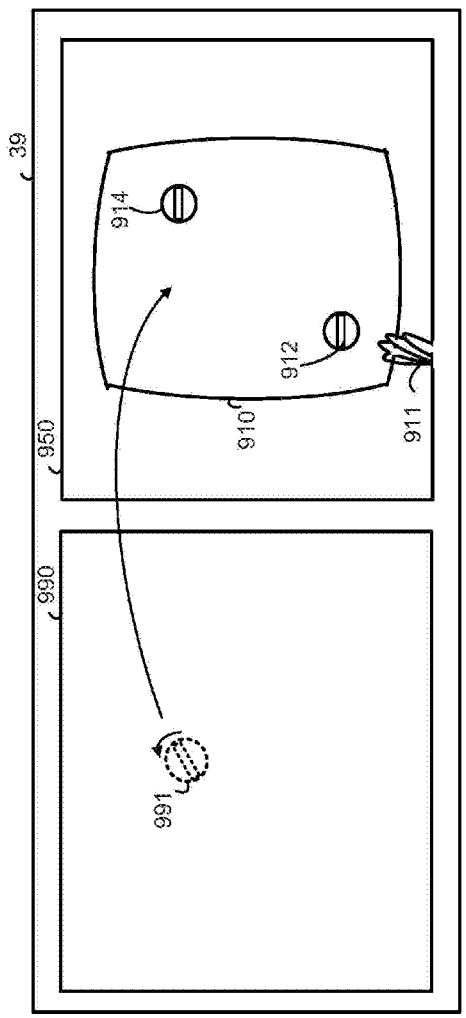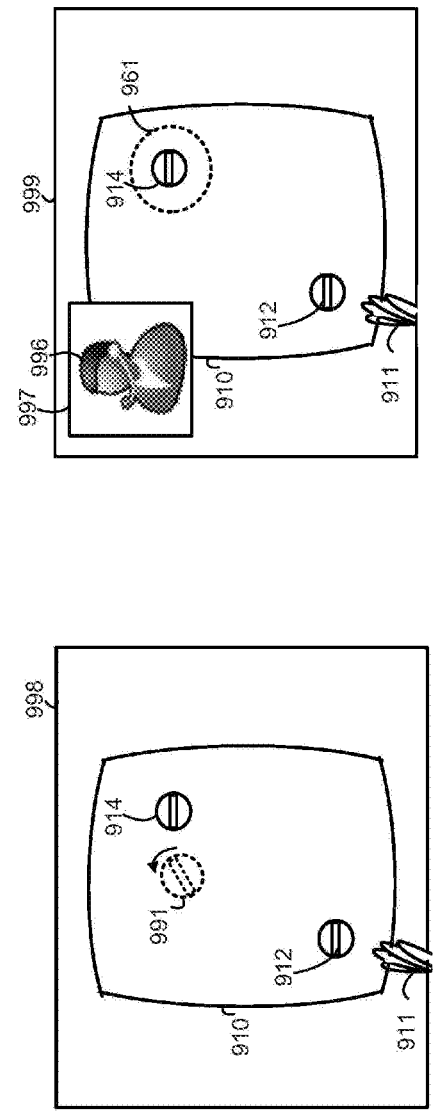

FIG. 11A

Service consumers (1050)

| Id: | Name: | contact info: | Location preference: | Fee preference: | Rating preference: | Other: |
|---|---|---|---|---|---|---|
| SR1 | N1 | CI1 | LP1 | FP1 | RP1 | O1 |
| SR2 | N2 | CI2 | LP2 | FP2 | RP2 | O2 |
| SR3 | N3 | CI3 | LP3 | FP3 | RP3 | O3 |

FIG. 11B

Service providers (1060)

| Id: | Name: | contact info: | Location: | Fee: | Other: |
|---|---|---|---|---|---|
| SP1 | N4 | CI4 | LP4 | FP4 | O4 |
| SP2 | N5 | CI5 | LP2 | FP5 | O5 |
| SP3 | N6 | CI6 | LP1 | FP6 | O6 |

FIG. 12A

List of requests (1070)

| Id: | Description: | contact info: | Location: | Fee: | Other: | filter |
|---|---|---|---|---|---|---|
| R1 | Car repair | CI7 | LP7 | FP7 | O7 | contact |
| R2 | Interior decorating | CI8 | LP8 | FP8 | O8 | contact |
| R3 | Plumbing | CI9 | LP9 | FP9 | O9 | contact |
| R4 | Car repair | CI10 | LP10 | FP10 | O10 | contact |

FIG. 12B

Filtered list of requests (1080)

| Id: | Description: | contact info: | Location: | Fee: | Other: | |
|---|---|---|---|---|---|---|
| R1 | Car repair | CI7 | LP7 | FP7 | O7 | contact |
| R4 | Car repair | CI10 | LP10 | FP10 | O10 | contact |

SERVICE PROVISION USING PERSONAL AUDIO/VISUAL SYSTEM

CROSS-REFERENCE TO RELATED APPLICATIONS

This is a continuation-in-part application of U.S. patent application Ser. No. 13/250,878, titled "Personal Audio/Visual System," to K. Stone-Perez et al., filed Sep. 30, 2011, published as US2013/0277823 on Oct. 24, 2013, and incorporated herein by reference.

BACKGROUND

Augmented reality is a technology that allows virtual imagery to be mixed with a real world physical environment. For example, an augmented reality system can be used to insert an image of a dinosaur into a user's view of a room so that the user sees a dinosaur walking in the room. In many cases, augmented reality is accomplished using an apparatus that can be viewed by one person or a small number of people. Therefore, the augmented reality system can provide a personalized experience. There is an opportunity to use augmented reality in various entertainment and task situations.

SUMMARY

Technology described herein provides various embodiments for implementing an augmented reality system that can assist a user in performing an activity. For example, the system can include a head-mounted display device (HMDD) in the form of glasses that is worn by a user. The HMDD allows the user to quickly gain assistance from a qualified person via a live audio, video and data channel in which camera-captured images, augmented reality images and audio data (including voice data) can be exchanged. The qualified person can be selected from a screened pool of providers which are qualified to assist in a specific activity, such as car or home repairs. An online service can match user requests with qualified service providers which meet parameters regarding skills, fee, location, rating and other preferences. Once a session is established, the qualified person can view images captured by the HMDD and, in response, provide instructions to the user in the form of augmented reality images via the user's HMDD. For example, the augmented reality images may direct the user's attention to a certain area, or demonstrate a movement to perform.

In one approach, a user who is assisted in performing an activity is referred to as a service consumer or service-receiving or service-requesting user, and another user who provides the assistance is referred to as a service provider or service-providing user. A service server can be provided to connect the service consumer with an appropriate, qualified service provider and therefore act as an online clearinghouse.

One embodiment includes a method for use at head-mounted display device (HMDD) worn by a service consumer. The method comprises receiving image data of a scene (e.g., a physical environment) from at least one forward-facing camera of the HMDD. The image data of the scene is communicated to a computing device of the service provider, to allow the service provider to generate data to assist the service consumer in performing the activity. Essentially, the service provider can see what the service consumer sees, thereby "stepping into the shoes" of the service consumer. The HMDD receives the data generated by the service provider. The method further includes controlling an augmented reality projection system of the HMDD based on the data generated by the service provider to project at least one augmented reality image to the service consumer, to assist the service consumer in performing the activity. For example, the augmented reality image can highlight an area of the scene which the service provider wishes to direct to the attention of the service consumer. Or, the augmented reality image can provide an image of the service provider's hand, pointing to an area of the scene, or making a movement which the service consumer is directed to follow. Or, the augmented reality image can provide images such as textual instructions, static images, or moving images such as an animation, which explain an action that the service consumer should perform. Other options are possible as well.

The service provider can use an HMDD or a computing device having display screen, for instance, to communicate with the service consumer. Two-way audio communications are also provided. Further, a gaze-detection capability of the HMDD can be used to highlight areas of the scene by the service consumer or service provider.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A is an example configuration of one embodiment of the HMDD 2 of FIG. 1.

FIG. 2B is an example configuration of one embodiment of the hub computing system 12 and image capture devices 20A and 20B of FIG. 1.

FIG. 3B is a block diagram of one embodiment of hardware and software components of an auxiliary processing unit 4 of the HMDD 2 of FIG. 2A.

FIG. 5A is a flow chart describing an example embodiment of a method for provisioning services through a personal A/V apparatus such as the HMDD 2 of FIG. 1.

FIG. 5B is a flow chart describing another example embodiment of a method for provisioning services through the HMDD 2 of FIG. 1.

FIG. 9B depicts an image 955 which is based on the image 950 of FIG. 9A, with the addition of an augmented reality image which highlights a first area 956 of the scene.

FIG. 9C depicts an image 960 which is based on the image 950 of FIG. 9A, with the addition of an augmented reality image which highlights a second area 961 of the scene.

FIG. 9D1 depicts an image 965 which is based on the image 960 of FIG. 9C, with the addition of an image of the service provider's hand 923 of FIG. 9A in a first position.

FIG. 9D2 depicts an augmented reality image 970 of the service provider's hand 923 and the highlighted second area 961 in isolation.

FIG. 9H depicts images 950 and 990 on the display device 39 of FIG. 9A which allow the service provider 940 to select an animation 991 as an augmented reality image.

FIG. 9I depicts an image 998 with the animation of FIG. 9H.

FIG. 9J depicts an image 999 which is based on the image 950 of FIG. 9A, with the addition of an image 996 of the service provider in an insert window 997.

FIG. 11A depicts an example data record 1050 of the database 56 of the service server 24 of FIG. 1 for service consumers.

FIG. 11B depicts an example data record 1060 the service server 24 of FIG. 1 for service providers.

FIG. 12A depicts an example user interface 1070 which allows service providers to contact service consumers.

FIG. 12B depicts another example user interface 1080 which allows service providers to contact service consumers, where a list of requests is filtered by the service provider.

DETAILED DESCRIPTION

Figure 1:
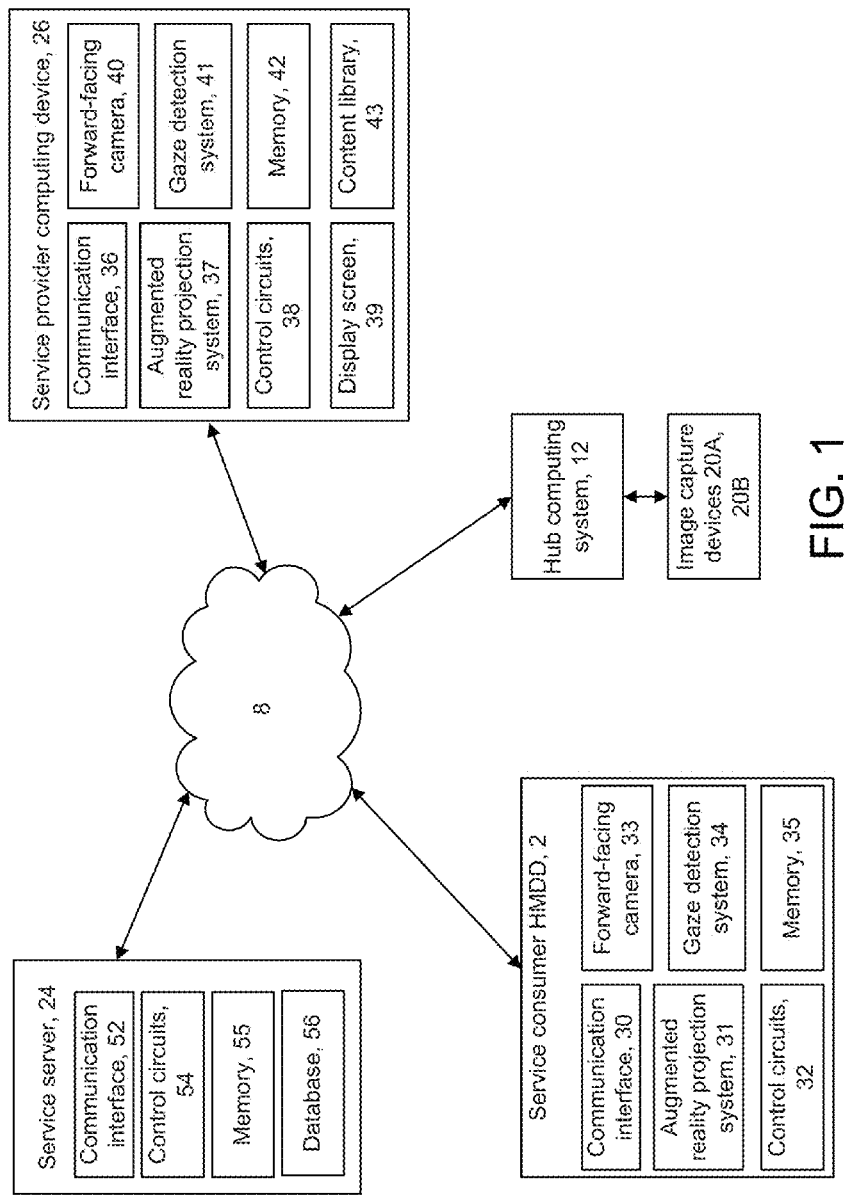
FIG. 1 depicts a system in which a service consumer user obtains assistance from a service provider in performing an activity.

The technology described herein includes a see-through, near-eye, mixed reality display device for assisting a user in performing an activity. The system can be used, e.g., in various educational, commercial, entertainment, sports and shopping situations to provide a mixed reality experience.

There are many situations in which it would be helpful for a user to be able to obtain assistance in performing an activity. For example, a user may desire assistance with an activity around the home, e.g., involving repairs or home improvements. Such activities may relate, e.g., to electrical, plumbing, painting or interior design. As another example, a user may desire assistance with an activity involving repair or maintenance of a car, bicycle, home appliance or other vehicle or machine. For a user who is stranded by a breakdown of a vehicle, immediate diagnosis of a problem and assistance in getting the vehicle back on the road can be a tremendous benefit. As another example, a user may desire assistance with learning to play a musical instrument. It would be desirable for the user to obtain assistance from another person who is far away but has special expertise.

The activity could involve some physical task by the user, but this is not required. An activity can involve a task which is performed in a session in which a service provider and a service consumer communicate. An activity which does not involve physical work could involve, e.g., planning, evaluating, learning or receiving sales information. For example, a user could communicate with an interior decorator to receive decorating ideas. The service consumer can walk around the house to show different areas to the interior decorator, in response to instructions by the interior decorator. The interior decorator can instruct movement and positioning of the service consumer around a room while explaining proposed decorating ideas.

In another example, a teacher assists a student with a math problem by writing out equations and making them visible to the student. In another example, a cook assists a person in cooking a meal. In another example, a remote teacher watches a student perform a task and assigns a grade. In another example, an expert guides a trainee in a medical procedure. The system allows collaboration between two or more users with sharing of visual imagery. The collaboration can occur pursuant to a demand by the service consumer or the service provider.

In some cases, the service provider and the service consumer are related, respectively, as a master and apprentice, a teacher and student, or a trainer and trainee.

In many cases, a user can be coached to perform a task which the user would otherwise be unable to perform by themselves without time-consuming research. Moreover, a task can usually be performed with a greater safety level when a novice user is coached by an experience person. An online service which matches users who need assistance with users who can provide assistance would be highly valuable. Such a service would allow service providers to share their talents and earn income by assisting others, without requiring their physical presence at the site of the activity. The service can match service consumers and service providers based on parameters such as location, fees, ratings and other preferences. Many new possibilities are opened up by a system as described herein.

Services can be provided through the HMDD of the service consumer by allowing the service consumer to quickly gain access to a pool of qualified service providers. When assistance is desired, the service consumer can communicate via the HMDD with a service server in a network, such as by voice, gestures or other commands. The service consumer describes the assistance which is desired and parameters such as a desired location, skills, and so forth. The service server selects a qualified service provider and provides a connection between the user's HMDD and the service provider's computing device. This selection and providing of a connection can be automatic, or can occur with the assistance of a live operator. Once a connection is established, an exchange of camera-captured images, augmented reality images and audio (including voice data) between the user's HMDD and the service provider's computing device occurs.

FIG. 1 depicts a system in which a service consumer user obtains assistance from a service provider in performing an activity. The system includes one or more networks 8 by which a number of components can communicate with one another. The network can include, e.g., Wi-Fi® (IEEE 802.11, a type of wireless local area network), BLUETOOTH® (IEEE 802.15.1, an open wireless protocol for exchanging data over short distances from fixed and mobile devices, creating personal area networks or piconets), infrared (e.g., IrDA® or INFRARED DATA ASSOCIATION® standard, a communications protocol for short range exchange of data over infrared light such as for use in personal area networks), cellular (e.g., Global System for Mobile communication (GSM) signals which are emitted from cell phone antennas), or other wireless communication means.

The system allows communication among one or more computing devices of service consumers (such as HMDD 2), one or more service servers (such as server 24) which provide an online clearinghouse for matching service consumers to service providers, one or more service provider computing devices such as computing device 26, and one or more hub computing systems (such as system 12).

The service server 24 can provide connections between the computing devices of service consumers and respective service providers. The service server 24 includes a communication interface 52, control circuits 54, memory 55 and a database 56 which can store records described in FIGS. 11A and 11B. The service server 24 can be configured with one or more applications which handle requests for assistance, match service consumers to service providers, make or facilitate connections between service consumers and service providers, and account for payments from service consumers to service providers.

In some cases, there is a one-to-one match such that one service consumer communicates with one service provider in a session. However, other options are possible, including one service consumer communicating with multiple service providers in a session. This might occur when the skills of different service providers are needed at the same time to assist the service consumer in performing an activity, or when it would be otherwise convenient. For example, a service consumer who is planning a remodel might desire the concurrent assistance of an interior decorator and a painter as service providers. In another example, multiple service consumers communicate with one service provider in a session. For example, this might be useful in a class in which a teacher instructs students. In another example, multiple service consumers communicate with multiple service providers in a session.

The HMDD 2 can include components such as a communication interface 30, an augmented reality projection system 31 (a type of a display device), control circuits 32, one or more forward-facing cameras 33 (or cameras which otherwise capture a room or other physical environment of the user), a gaze detection system 34 (detecting a gaze direction of the service consumer or other user) and one or more memory components 35. See also FIGS. 2A, 3A and 3B which provide further details. The HMDD allows the service consumer to view the physical environment with augmented reality images image superimposed over it. The HMDD also allows and communication of audio and video data with a service provider's computing device.

The service provider's computing device 26 may or may not include an HMDD. The computing device 26 can include components such as a communication interface 36, an augmented reality projection system 37, control circuits 38, a display screen/monitor (a type of a display device) 39, one or more forward-facing cameras 40 (or cameras which otherwise capture a room or other physical environment of the user), a gaze detection system 41 (detecting a gaze direction of the service provider), one or more memory components 42, and a content library 43. In one approach, the components of the service provider's computing device 26 correspond to the like-named components of the HMDD 2. The computing device 26 allows the service provider to view captured images and audio of the physical environment of the service consumer, based on image and audio data communicated from the HMDD 2. The computing device 26 can also allow the service provider to view augmented reality images which are displayed on the HMDD of the service consumer (e.g., where such images are provided independently of the service provider, such as from a local data source of the HMDD), and provide augmented reality images on the HMDD of the service consumer (such as textual instructions, static images, or moving images such as an animation, which explain an action that the service consumer should perform).

In an implementation in which the service provider computing device 26 is an HMDD, it can have a similar configuration as the HMDD 2.

The hub computing system 12 and image capture devices 20A and 20B can provide content and processing capabilities for the HMDD 2, as well as provide other features such as discussed in connection with FIGS. 2B, 4A and 4B.

FIG. 2A is a block diagram depicting example components of one embodiment of a see-through, mixed reality display device in a system environment in which the device may operate. In this example, the HMDD 2 includes a head-mounted portion 3 and an auxiliary processing unit 4. In other embodiments, the capabilities of the auxiliary processing unit may be integrated in software and hardware components of the head-mounted portion 3.

Here, the HMDD 2 is in communication with processing unit 4 via wire 6. In other embodiments, head-mounted display device 2 communicates with processing unit 4 via wireless communication. Processing unit 4 may take various embodiments. In some embodiments, processing unit 4 is a separate unit which may be worn on the user's body, e.g. the wrist in the illustrated example or in a pocket, and includes much of the computing power used to operate near-eye display device 2. Processing unit 4 may communicate wirelessly to the service provider's computing device 32, one or more hub computing systems 12, hot spots, cellular data networks, etc. The processing unit 4 could be a mobile computing device, for instance, which is held or worn by the user, or situated near the user.

The HMDD 2, which in one embodiment, is in the shape of eyeglasses in a frame 115, is worn on the head of a user so that the user can see through a display, embodied in this example as a display optical system 14 for each eye, and thereby have a direct view of the physical environment in front of the user. Augmented reality images, also referred to as virtual images, can be generated by a projection system of the HMDD and appear to be present in, or superimposed over, the physical environment.

Frame 115 provides a support for holding elements of the system in place as well as a conduit for electrical connections. In this embodiment, frame 115 provides a convenient eyeglass frame as support for the elements of the system discussed further below. In other embodiments, other support structures can be used. An example of such a structure is a visor, hat, helmet or goggles. The frame 115 includes a temple or side arm for resting on each of a user's ears. Temple 102 is representative of an embodiment of the right temple and includes control circuitry 136 for the display device 2. Nose bridge 104 of the frame includes a microphone 110 for recording sounds such as spoken commands of the user, or sounds in the physical environment of the user, and transmitting audio data to processing unit 4.

FIG. 2B is an example configuration of one embodiment of the hub computing system 12 and image capture devices 20A and 20B of FIG. 1. In one possible approach, the HMDD 2 communicates with the service provider's computing device via the hub computing system 12. In another possible approach, the hub computing system 12 is not used and the HMDD 2 communicates with the service provider's computing device directly via the network 8.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. An application execute on hub computing system 12, the HMDD 2, or a combination of these.

One or more depth cameras, such as image capture devices 20A and 20B, can be used to capture the room or other physical environment of the user. The image capture devices can visually monitor one or more users and the surrounding space such that gestures and/or movements performed by the one or more users, as well as the structure of the surrounding space, may be captured, analyzed, and tracked to perform one or more controls or actions within an application and/or animate an avatar or on-screen character.

Hub computing system 12 may be connected to speakers 22 and an audiovisual device 16 such as a television, a monitor, a high-definition television (HDTV), or the like that may provide game or application visuals.

Figure 3A:
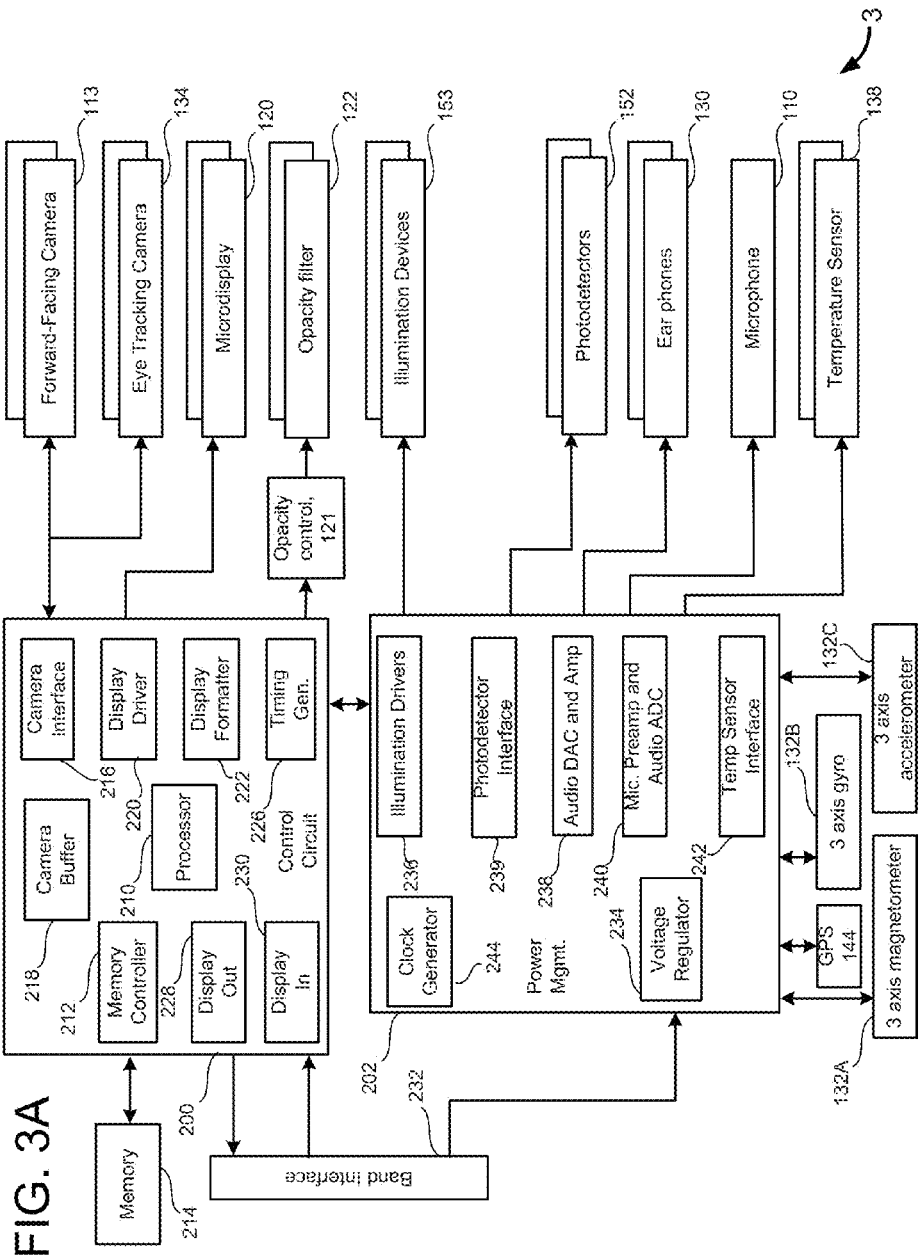
FIG. 3A is a block diagram of one embodiment of hardware and software components of the head-mounted portion 3 of the HMDD 2 of FIG. 2A.

FIG. 3A is a block diagram of one embodiment of hardware and software components of the head-mounted portion 3 of the HMDD 2 of FIG. 2A. In this embodiment, the head-mounted portion 3 of the HMDD 2 receives instructions about a virtual image from processing unit 4 and provides the sensor information back to processing unit 4. Software and hardware components which may be embodied in a processing unit 4, depicted in FIG. 3B, receive the sensory information from the head-mounted portion 3 of the HMDD 2 and may also receive sensory information from hub computing device 12 (see FIGS. 2B, 4A and 4B). Based on that information, processing unit 4 will determine where and when to provide a virtual image to the user and send instructions accordingly to the control circuitry 136 of the HMDD 2.

Note that some of the components of FIG. 3A (e.g., a forward-facing camera 113 (or a camera which otherwise faces a physical environment), eye tracking camera 134, photodetector interface 139, microdisplay 120, opacity filter 122 with opacity control 121, illumination device 153 or illuminators, earphones 130, and temperature sensor 138 are shown in shadow to indicate that there are at least two of each of those devices, at least one for the left side and at least one for the right side of HMDD 2.

Regarding the forward-facing camera 113, in one approach, one camera is used to obtain images using visible light. In another approach, two or more cameras with a known spacing between them are used as a depth camera to also obtain depth data for objects in a room, indicating the distance from the cameras/HMDD to the object. The forward cameras of the HMDD can essentially duplicate the functionality of the depth camera provided by the computer hub 12, as described, e.g., in connection with FIG. 4B.

Images from forward facing cameras can be used to identify a physical environment of the user, including a scene which is viewed by the user, e.g., including people and other objects in a field of view of the user, as well as gestures such as a hand gesture of the user.

The control circuit 200, in communication with the power management circuit 202, includes processor 210, memory controller 212 in communication with memory 214 (e.g., DRAM), camera interface 216, camera buffer 218, display driver 220, display formatter 222, timing generator 226, display out 228, and display in interface 230. In one embodiment, all of components of display driver 220 are in communication with each other via dedicated lines of one or more buses. In another embodiment, each of the components of control circuit 200 is in communication with processor 210.

Display formatter 222 provides information, about the image being displayed on microdisplay 120, to opacity control circuit 121, which controls opacity filter 122. Opacity filter 122 selectively blocks natural light, either uniformly or on a per-pixel basis, from passing through a light guide optical element 112. In one embodiment, the opacity filter can be a see-through LCD panel, electrochromic film, or similar device. The LCD panel can include one or more light-transmissive LCD chips which allow light to pass through the liquid crystal. Opacity filter 114 can include a dense grid of pixels, where the light transmissivity of each pixel is individually controllable between minimum and maximum transmissivities. A transmissivity can be set for each pixel by the opacity filter control circuit 121.

Camera interface 216 provides an interface to the two physical environment facing cameras 113 and each eye tracking camera 134 and stores respective images received from the cameras 113, 134 in camera buffer 218. Display driver 220 drives microdisplay 120. Display formatter 222 may provide information, about the virtual image being displayed on microdisplay 120 to one or more processors of one or more computer systems, e.g. 4, 12, 210 performing processing for the augmented reality system. Timing generator 226 is used to provide timing data for the system. Display out 228 is a buffer for providing images from physical environment facing cameras 113 and the eye tracking cameras 134 to the processing unit 4. Display in 230 is a buffer for receiving images such as a virtual image to be displayed on microdisplay 120. Display out 228 (an interface) and display in 230 communicate with band interface 232, which is an interface to processing unit 4.

Power management circuit 202 includes voltage regulator 234, eye tracking illumination driver 236, photodetector interface 239, audio DAC and amplifier 238, microphone preamplifier and audio ADC 240, temperature sensor interface 242, and clock generator 244. Voltage regulator 234 receives power from processing unit 4 via band interface 232 and provides that power to the other components of head-mounted display device 2. Illumination driver 236 controls, for example via a drive current or voltage, the illumination devices 153 to operate about a predetermined wavelength or within a wavelength range. Audio DAC and amplifier 238 receives the audio information from earphones 130. Microphone preamplifier and audio ADC 240 provides an interface for microphone 110. Temperature sensor interface 242 is an interface for temperature sensor 138. Power management circuit 202 also provides power and receives data back from three axis magnetometer 132A, three axis gyro 132B and three axis accelerometer 132C. Power management unit 202 also provides power and receives data back from and sends data to GPS transceiver 144.

The photodetector interface 239 performs any analog to digital conversion needed for voltage or current readings from each photodetector, stores the readings in a processor readable format in memory via the memory controller 212, and monitors the operation parameters of the photodetectors 152 such as temperature and wavelength accuracy.

For the HMDD 2 of FIG. 1, the communication interface 30 can comprise band interface 232, the augmented reality projection system 31 can comprise microdisplay 120, display driver 220, display formatter 222, opacity filter 122, opacity control 121, and illumination devices 153, the control circuits 32 can comprise processor 210 and memory controller 212, the one or more forward-facing cameras 33 can comprise forward-facing camera 113, camera interface 21 and camera buffer 218, the gaze detection system 34 can comprise eye tracking camera 134, and the one or more memory components 35 can comprise memory 214.

FIG. 3B is a block diagram of one embodiment of the hardware and software components of a processing unit 4 associated with a see-through, near-eye, mixed reality display unit. Control circuit 304 is in communication with power management circuit 306, and includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with the head-mounted portion 3 of the HMDD 2 via band interface 302 and band interface 232, display in buffer 338 in communication with the head-mounted portion 3 of the HMDD 2 via band interface 302 and band interface 232, microphone interface 340 in communication with an external microphone connector 342 for connecting to a microphone, PCI express interface 344 for connecting to a wireless communication device 346, and USB port(s) 348.

In one embodiment, wireless communication device 346 can include a WI-FI® enabled communication device, BLUETOOTH communication device, infrared communication device, etc. The USB port can be used to dock the processing unit 4 to hub computing device 12 in order to load data or software onto processing unit 4, as well as charge processing unit 4. In one embodiment, CPU 320 and GPU 322 are the main workhorses for determining where, when and how to insert images into the view of the user.

Power management circuit 306 includes clock generator 360, analog to digital converter 362, battery charger 364, voltage regulator 366, see-through, near-eye display power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power source 376 provides power to the display device 2.

For the HMDD 2 of FIG. 1, the communication interface 30 can comprise band interface 302 and wireless communication device 346, the control circuits 32 can comprise flash controller 332, memory controller 328, CPU 320 and GPU 322 and the one or more memory components 35 can comprise flash memory 334, memory 330 and cache 324, RAM 326.

Figure 4A:
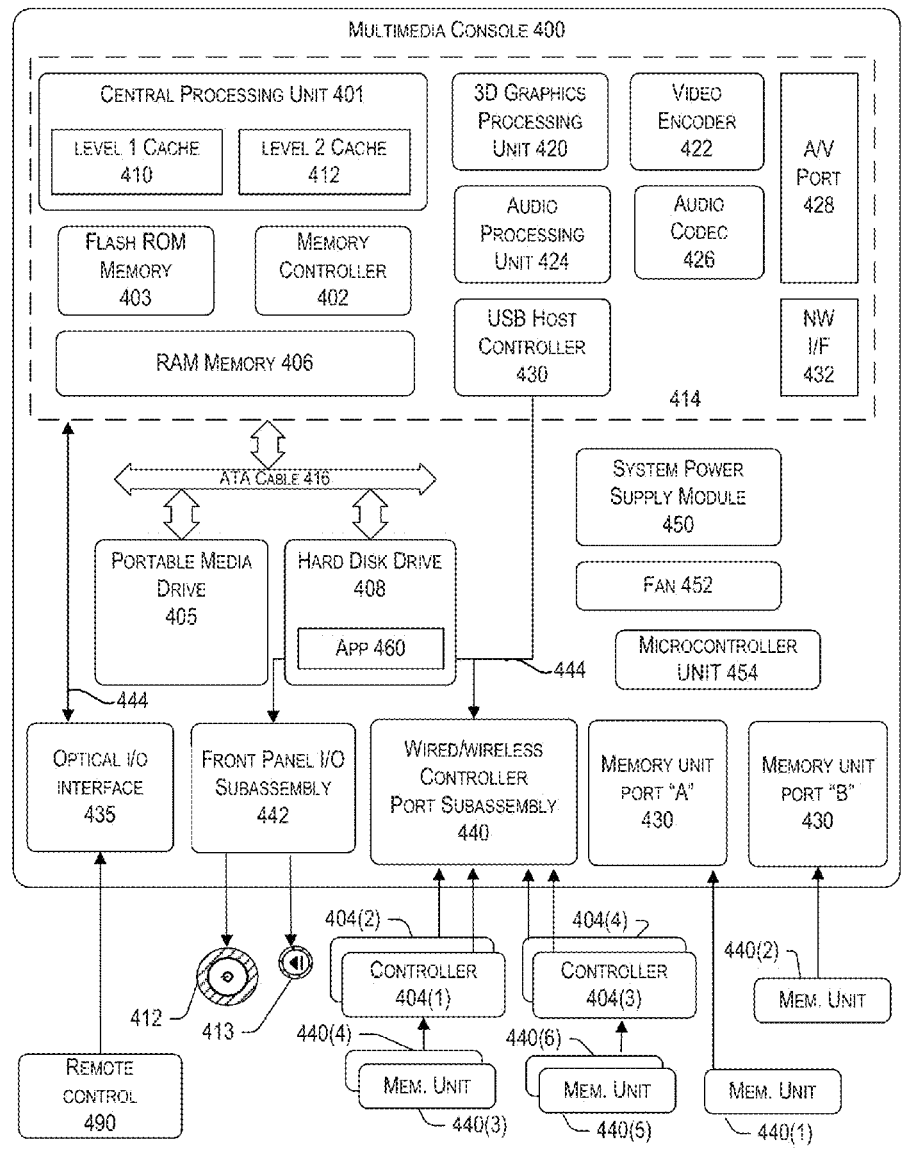
FIG. 4A is a block diagram of one embodiment of a computing system that can be used to implement the hub computing system 12 of FIG. 1.

FIG. 4A is a block diagram of one embodiment of a computing system that can be used to implement the hub computing system 12 of FIG. 1. In this embodiment, the computing system is a multimedia console 400, such as a gaming console. The multimedia console 400 has a CPU 401, and a memory controller 402 that facilitates processor access to various types of memory, including a flash Read Only Memory (ROM) 403, a Random Access Memory (RAM) 406, a hard disk drive 408, and portable media drive 405. In one implementation, CPU 401 includes a level 1 cache 410 and a level 2 cache 412, to temporarily store data and hence reduce the number of memory access cycles made to the hard drive 408, thereby improving processing speed and throughput.

CPU 401, memory controller 402, and various memory devices are interconnected via one or more buses (not shown).

In one implementation, CPU 401, memory controller 402, ROM 403, and RAM 406 are integrated onto a common module 414. In this implementation, ROM 403 is configured as a flash ROM that is connected to memory controller 402 via a PCI bus and a ROM bus (neither of which are shown). RAM 406 is configured as multiple Double Data Rate Synchronous Dynamic RAM (DDR SDRAM) modules that are independently controlled by memory controller 402 via separate buses (not shown). Hard disk drive 408 and portable media drive 405 are shown connected to the memory controller 402 via the PCI bus and an AT Attachment (ATA) bus 416.

A GPU 420 and a video encoder 422 form a video processing pipeline for high speed and high resolution graphics processing. Data are carried from GPU 420 to video encoder 422 via a digital video bus (not shown). Lightweight messages generated by the system applications (e.g., pop ups) are displayed by using a GPU 420 interrupt to schedule code to render popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

An audio processing unit 424 and an audio codec (coder/decoder) 426 form a corresponding audio processing pipeline for multi-channel audio processing of various digital audio formats. Audio data are carried between audio processing unit 424 and audio codec 426 via a communication link (not shown). The video and audio processing pipelines output data to an A/V (audio/video) port 428 for transmission to a television or other display. In the illustrated implementation, video and audio processing components 420-428 are mounted on module 414.

A module 414 includes a USB host controller 430 and a network interface 432. USB host controller 430 is shown in communication with CPU 401 and memory controller 402 via a bus (e.g., PCI bus) and serves as host for peripheral controllers 404(1)-404(4). Network interface 432 provides access to a network (e.g., Internet, home network, etc.) and may be any of a wide variety of various wired or wireless interface components.

In the implementation depicted, console 400 includes a controller support subassembly 440 for supporting four controllers 404(1)-404(4). The controller support subassembly 440 includes any hardware and software components needed to support wired and wireless operation with an external control device, such as for example, a media and game controller. A front panel I/O subassembly 442 supports the multiple functionalities of power button 412, the eject button 413, as well as any LEDs (light emitting diodes) or other indicators exposed on the outer surface of console 402. Subassemblies 440 and 442 are in communication with module 414 via one or more cable assemblies 444. In other implementations, console 400 can include additional controller subassemblies. An optical I/O interface 435 sends and receives signals that can be communicated to module 414.

Memory units (MUs) 440(1) and 440(2) are connectable to MU ports "A" 430(1) and "B" 430(2) respectively. Additional MUs (e.g., MUs 440(3)-440(6)) are illustrated as being connectable to controllers 404(1) and 404(3), i.e., two MUs for each controller. Controllers 404(2) and 404(4) can also be configured to receive MUs (not shown). Each MU 440 offers additional storage on which games, game parameters, and other data may be stored. In some implementations, the other data can include any of a digital game component, an executable gaming application, an instruction set for expanding a gaming application, and a media file. When inserted into console 400 or a controller, MU 440 can be accessed by memory controller 402. A system power supply module 450 provides power to the components of gaming system 400. A fan 452 cools the circuitry within console 400. A microcontroller unit 454 is also provided.

An application 460 comprising machine instructions is stored on hard disk drive 408. When console 400 is powered on, various portions of application 460 are loaded into RAM 406, and/or caches 410 and 412, for execution on CPU 401, wherein application 460 is one such example. Various applications can be stored on hard disk drive 408 for execution on CPU 401.

Gaming and media system 400 may be operated as a standalone system by simply connecting the system to monitor 16 (FIG. 2B), a television, a video projector, or other display device. In this standalone mode, gaming and media system 400 enables one or more players to play games, or enjoy digital media, e.g., by watching movies, or listening to music. However, with the integration of broadband connectivity made available through network interface 432, gaming and media system 400 may further be operated as a participant in a larger network gaming community.

The system described above can be used to add virtual images to a user's view such that the virtual images are mixed with real images that the user see. In one example, the virtual images are added in a manner such that they appear to be part of the original scene. Examples of adding the virtual images can be found U.S. patent application Ser. No. 13/112,919, "Event Augmentation With Real-Time Information," filed on May 20, 2011; and U.S. patent application Ser. No. 12/905, 952, "Fusing Virtual Content Into Real Content," filed on Oct. 15, 2010; both applications are incorporated herein by reference in their entirety.

Figure 4B:
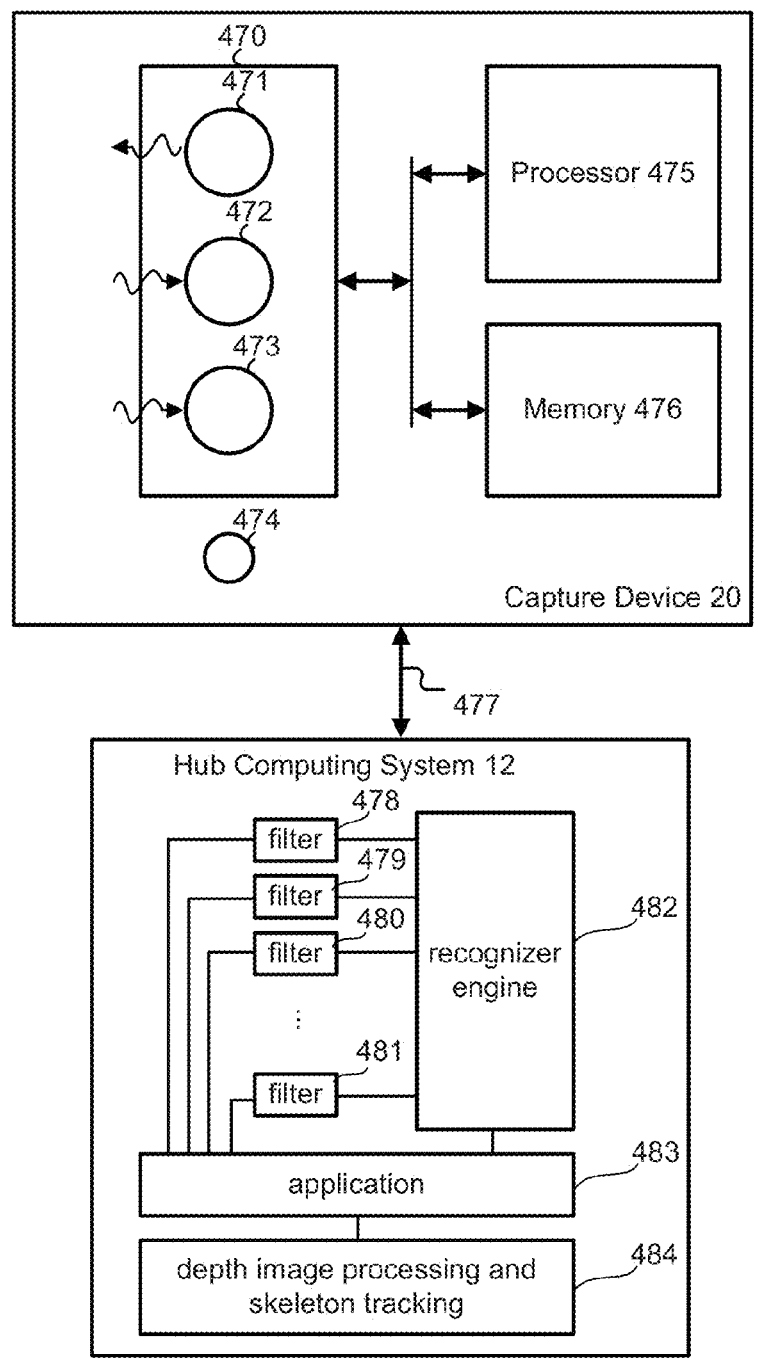
FIG. 4B is a block diagram of one embodiment of the components of the hub computing system 12 and the image capture devices 20A and 20B of FIG. 1.

FIG. 4B is a block diagram of one embodiment of the components of the hub computing system 12 and the image capture devices 20A and 20B of FIG. 1. However, the description can also apply to the HMDD 2, where the depth cameras (a capture device) use the forward-facing camera 113 to obtain and process images to detect a gesture such as a hand gesture, for instance, or a distance from the HMDD to an object in a scene. Capture device 20 (representing 20A and/or 20B) may be configured to capture video with depth information including a depth image that may include depth values via any suitable technique including, for example, time-of-flight, structured light, stereo image, or the like. The capture device 20 may organize the depth information into "Z layers," or layers that may be perpendicular to a Z axis extending from the depth camera along its line of sight.

A camera component 470 may be or may include a depth camera that may capture a depth image of a scene. The depth image may include a two-dimensional (2-D) pixel area of the captured scene where each pixel in the 2-D pixel area may represent a depth value as a distance of an object in the captured scene from the camera.

Camera component 470 may include an infrared (IR) light emitting component 471 (which emits IR radiation as indicated by the arrow moving away from the component), an IR camera 472 (which senses IR radiation as indicated by the arrow moving toward the component), and an RGB (visual image) camera 473 (which senses visible radiation as indicated by the arrow moving toward the component) that may be used to capture the depth image of a scene. A 3-D camera is formed by the combination of the IR light emitting component 471 and the IR camera 472. In a time-of-flight analysis, the IR light emitting component 471 emits IR light onto the scene. Sensors such as the IR camera 472 and/or the RGB camera 473 are then used to detect the backscattered light from the surface of one or more targets and objects in the scene. In some embodiments, pulsed IR light may be used such that the time between an outgoing light pulse and a corresponding incoming light pulse is measured and used to determine a physical distance from the capture device 20 to a particular location on the targets or objects in the scene. Additionally, the phase of the outgoing light wave may be compared to the phase of the incoming light wave to determine a phase shift. The phase shift may then be used to determine a physical distance from the capture device to a particular location on the targets or objects.

A time-of-flight analysis may be used to indirectly determine a physical distance from the capture device 20 to a particular location on the targets or objects by analyzing the intensity of the reflected beam of light over time via various techniques including, for example, shuttered light pulse imaging.

The capture device 20 may use a structured light to capture depth information. In such an analysis, patterned light (i.e., light displayed as a known pattern such as grid pattern, a stripe pattern, or different pattern) may be projected onto the scene via, for example, the IR light emitting component 471. Upon striking the surface of one or more targets or objects in the scene, the pattern may become deformed in response. Such a deformation of the pattern may be captured by, for example, the IR camera 472 and/or the RGB camera 473 (and/or other sensor) and may then be analyzed to determine a physical distance from the capture device to a particular location on the targets or objects. In some implementations, the IR light emitting component 471 is displaced from the cameras 472 and 473 so that triangulation can be used to determined distance from cameras 472 and 473. In some implementations, the capture device 20 will include a dedicated IR sensor to sense the IR light, or a sensor with an IR filter.

The capture device 20 may include two or more physically separated cameras that may view a scene from different angles to obtain visual stereo data that may be resolved to generate depth information. Other types of depth image sensors can also be used to create a depth image. The capture device 20 may further include a microphone 474.

A processor 475 may execute instructions for receiving a depth image, generating the appropriate data format (e.g., frame) and transmitting the data to hub computing system 12.

A memory 476 stores the instructions that are executed by processor 475, images or frames of images captured by the 3-D camera and/or RGB camera, or any other suitable information, images, or the like.

Capture device 20 is in communication with hub computing system 12 via a communication link 477 such as a wired or wireless connection. The capture device 20 provides the depth information and visual (e.g., RGB or other color) images captured by, for example, the 3-D camera 472 and/or the RGB camera 473 to hub computing system 12 via the communication link 477. Hub computing system 12 may then create and use a model, depth information, and captured images to, for example, control an application such as a game or word processor and/or animate an avatar or on-screen character.

Hub computing system 12 includes depth image processing and skeletal tracking module 484, which uses the depth images to track one or more persons detectable by the depth camera function of capture device 20. Module 484 provides the tracking information to application 483, which can be a video game, productivity application, communications application or other software application. The audio data and visual image data is also provided to application 483 and module 484. Application 483 provides the tracking information, audio data and visual image data to recognizer engine 482. In another embodiment, recognizer engine 482 receives the tracking information directly from module 484 and receives the audio data and visual image data directly from capture device 20.

Recognizer engine 482 is associated with a collection of filters 478, 479, 480, . . . , 481 each comprising information concerning a gesture, action or condition that may be performed by any person or object detectable by capture device 20. For example, the data from capture device 20 may be processed by filters 478, 479, 480, . . . , 481 to identify when a user has performed one or more gestures or other actions. Those gestures may be associated with various controls, commands, objects or conditions of application 483.

As mentioned, the functions of the capture device 2 and hub computing system 12 of FIG. 4B can be provided in the HMDD, additionally or alternatively.

One or more control circuits can be provided, e.g., by the components 4, 32, 38, 54, 401, 420, 424, 454 and 484. The one or more control circuits can include one or more processors which execute instructions stored on one or more tangible, non-transitory processor-readable storage devices for performing processor- or computer-implemented methods described herein. At least one control circuit can also include the one or more tangible, non-transitory processor-readable storage devices, or other non-volatile or volatile storage devices. The storage device, as a computer-readable media, can be provided, e.g., by components 35, 42, 55, 56, 214, 326, 330, 334, 403, 406, 410, 412, 440(1)-440(6) and 476.

Service Provision Using Personal A/V System

A system using one or more personal A/V apparatuses can also be used to provide services to users from remote service providers (e.g., service providers). Through the use of personal A/V apparatus, a user can easily obtain a short period of service from an expert, allow an expert to see what the user sees, allow the user to see what the expert sees and/or allow the expert to guide the user. Because the services are provided through the personal A/V apparatus, it is possible that the person can be receiving the services while no one else around the person knows. For example, the person will see images from the service provider through the private optical system of the personal A/V apparatus and receive audio through an earphone of the personal A/V apparatus.

One embodiment includes a method for providing services using a personal A/V apparatus, comprising: authenticating a user and a service provider; connecting a personal A/V apparatus for the user to a central server; connecting personal A/V apparatus of a service provider to a central server; transmitting sensor data from the user's personal A/V apparatus to the service provider's personal A/V apparatus via the central server and the two connections; allowing a service provider to view through the service provider's personal A/V apparatus as if the service provider was looking through the user's personal A/V apparatus; and providing the service provider with the ability to send images to be viewed by the user through the user's personal A/V apparatus and audio to be listened to by the user through the user's personal A/V apparatus.

Figure 4C:
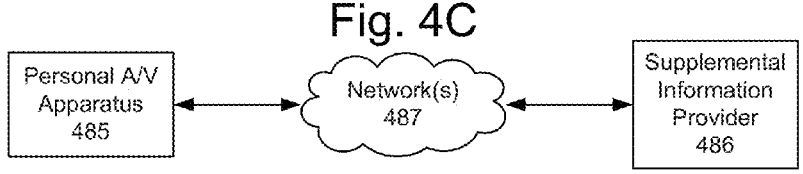
FIG. 4C is a block diagram of one embodiment of a system used to provide a customized experience.

Technology is also presented for augmenting a user experience at various situations. In one embodiment, an information provider prepares supplemental information regarding actions and objects occurring within an event. A user wearing an at least partially see-through, head mounted display can register (passively or actively) their presence at an event or location and a desire to receive information about the event or location. FIG. 4C illustrates a block diagram of a system for implementing the augmenting of the user experience. For example, FIG. 4C shows a personal audio/visual ("A/V") apparatus 485 in communication with a Supplemental Information Provider 486 via one or more networks 487.

In one embodiment, the personal A/V apparatus 485 can be head mounted display device 2 (or other A/V apparatus) in communication with a local processing apparatus (e.g., processing unit 4 of FIG. 2A, a mobile device, or other suitable data processing device). One or more networks 487 can include wired and/or wireless networks, such as a LAN, WAN, WiFi, the Internet, an Intranet, cellular network etc. No specific type of network or communication means is required. In one embodiment, Supplemental Information Provider 486 is implemented in hub computing system 12 (See FIG. 1). However, Supplemental Information Provider 486 can also be implemented in other types of computing devices (e.g., desktop computers, laptop computers, servers, mobile computing devices, tablet computers, mobile telephones, etc.). Supplemental Information Provider 486 can be implemented as one computing device or multiple computing devices. In one embodiment, Supplemental Information Provider 486 is located locally to personal A/V apparatus 485 so that they communication over a local area network, WI-FI®, BLUETOOTH® or other short range communication means. In another embodiment, Supplemental Information Provider 486 is located remotely from personal A/V apparatus 485 so that they communication over the Internet, cellular network or other longer range communication means.

Figure 4D:
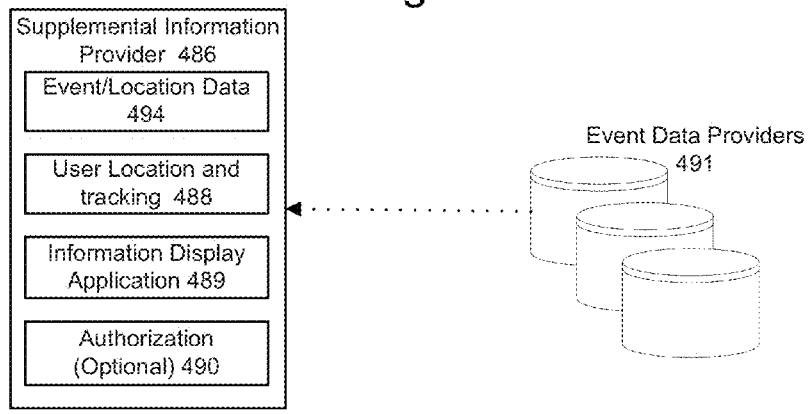
FIG. 4D is a block diagram of another embodiment of a system used to provide a customized experience.

FIG. 4D shows an example architecture for one or more processes and/or software running on Supplemental Information Provider 486. Supplemental Information Provider 486 may create and provide supplemental event or location data, or may provide services which transmit event or location data from third party event data providers 491 to a user's personal A/V apparatus 485. Multiple supplemental information providers and third party event data providers may be utilized with the present technology. A supplemental information provider 486 will include data storage for supplemental live event information 494, user location and tracking module 488, information display applications 494, and an authorization component 490.

Supplemental Information Provider 486 includes the supplemental event data for one or more events or locations for which the service is utilized. Event and/or location data can include supplemental event and location data 510 about one or more events known to occur within specific periods and/or about one or more locations that provide a customized experience. User location and tracking module 488 keeps track of various users which are utilizing the system. Users can be identified by unique user identifiers, location and other elements. An information display application 489 allows customization of both the type of display information to be provided to users and the manner in which it is displayed. The information display application 489 can be utilized in conjunction with an information display application on the personal A/V apparatus 485. In one embodiment, the display processing occurs at the Supplemental Information Provider 486. In alternative embodiments, information is provided to personal A/V apparatus 485 so that personal A/V apparatus 485 determines which information should be displayed and where, within the display, the information should be located. Third party supplemental information providers 486 can provide various types of data for various types of events, as discussed herein.

Various types of information display applications can be utilized in accordance with the present technology. Different applications can be provided for different events and locations. Different providers may provide different applications for the same live event. Applications may be segregated based on the amount of information provided, the amount of interaction allowed or other feature. Applications can provide different types of experiences within the event or location, and different applications can compete for the ability to provide information to users during the same event or at the same location. Application processing can be split between the application on the supplemental information providers 486 and on the personal A/V apparatus 485.

Figure 4E:
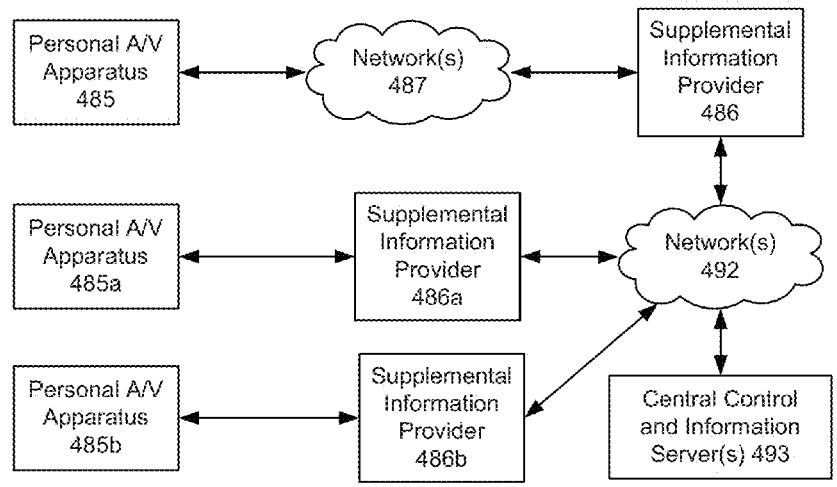
FIG. 4E is a block diagram of another embodiment of a system used to provide a customized experience.

FIG. 4E shows another configuration/embodiment in which Supplemental Information Provider 486 is located locally to personal A/V apparatus 485, and Supplemental Information Provider 486 is in communication with Central Control and Information Server(s) 493 via one or more networks 492. In one embodiment, one or more networks 492 can include wired and/or wireless networks, such as a LAN, WAN, WI-FI®), the Internet, an Intranet, cellular network etc. No specific type of network is required. Central Control and Information Server(s) 493 is/are located remotely from Supplemental Information Provider 486.

In one embodiment, Central Control and Information Server(s) 493 provide central control and data storage for multiple Supplemental Information Providers 486, 486a, 486b, . . . which are in communication with respective personal A/V apparatus 485, 485a, 485b, . . . Each of the Supplemental Information Providers 486, 486a, 486b, . . . are at different locations and able to connect to any personal A/V apparatus that is within a geographic region of the respective Supplemental Information Provider.

FIG. 5A is a flow chart describing an example embodiment of a method for provisioning services through a personal A/V apparatus such as the HMDD 2 of FIG. 1. In one embodiment, the system will implement the system of FIG. 1 with the user operating personal A/V apparatus being the HMDD 2 and the service provider operating personal A/V apparatus being the computing device 26. In this embodiment, the service server 24 can act as a central server between the users and their respective devices.

In step 500, the user of the personal A/V apparatus will authenticate. In one embodiment, authentication is limited to the personal A/V apparatus. In another embodiment, authentication will be performed in conjunction with a Supplemental Information Provider and/or Central Control and Information Servers (e.g., server 24). In step 502, the user will request a service provider to provide a service. In one embodiment, the user will have an identity of the service provider and request that particular identity to the personal A/V apparatus.

In another embodiment, the user will know that the user wants the service but will not know an identity of a particular provider. Therefore, the user will request a service, the system will provide the user with a list of services, the user will choose a service from the list, the system will provide the user with a list of service providers for the chosen service, and the user will choose one of the service providers. This process of choosing can be performed with a set of menus, voice commands, commands made by hand gestures or head nods, or other selection means. In one approach, the service consumer speaks with a live operator to provide the request, and the operator identifies an appropriate service provider and connects the service provider's computing device to the service consumer's HMDD.

In step 504, the user's personal A/V apparatus will contact the service server (in this case either Supplemental Information Provider or Central Control and Information Servers). The personal A/V apparatus will request the service from the service server. In step 506, the service server will contact the specific service provider by sending a request to the service provider's personal A/V apparatus. In step 508, the service provider will receive the request at the service provider's personal A/V apparatus and accept or reject the request for the service. This example assumes the service provider accepts the request for service using the service provider's personal A/V apparatus. In step 510, the service provider will authenticate. In one embodiment, the authentication is performed with personal A/V apparatus for the service provider. In some embodiments, the authentication will all be formed in conjunction with Supplemental Information Provider and/or Central Control and Information Servers.

After the service provider accepts the request for the service and authenticates, the system is ready to facilitate the service. In one example implementation, the service is provided such that it is personal to the user and others around the user will not be able to perceive the service, and the service provider will be able to step into the shoes of the user through the personal A/V apparatus.

In step 512, the service server will make a connection with the personal A/V apparatus. The connection is persistent for the duration of the service and can be performed using various networking protocols known in the art. In step 514, the service server will make a connection with the service provider's personal A/V apparatus. At this point, the service provider's personal A/V apparatus is now in communication with the user's personal A/V apparatus via a service server and the two persistent connections. In step 516, sensor data from the user's personal A/V apparatus is transmitted to the service provider's personal A/V apparatus via the service server and the two persistent connections. In this manner, the service provider's personal A/V apparatus will project a video for the service provider to see through the personal A/V apparatus of the service provider (step 518). The video will show the scene/environment in front of the user by taking the output of the cameras (still, video and/or depth) from the user's A/V apparatus. Additionally, any graphics being superimposed in the see-through display of the user's A/V apparatus will also be provided to the service provider's A/V apparatus, therefore, the service provider is effectively looking through the service provider's personal A/V apparatus as seeing what the user sees through the user's personal A/V apparatus. As the user talks, the service provider can hear when the user says and sees what the user sees. In this manner, the service provider can help the user perform an activity, answer questions, fix things, etc.

Using a gaze detection capability (see FIG. 8), the service will also be able to tell where the person is looking (e.g., eye tracking). For a car mechanic service provider, for example, this would give the expert the information to say "no, you're looking at the wrong thing," when the gaze direction of the service consumer indicates the service consumer is looking at the wrong part of the engine, for instance. In step 520, the service provider's personal A/V apparatus can send images to be viewed by the user through the user's personal A/V apparatus. Similarly, the service provider's personal A/V apparatus can send audio to be listened to by the user through the user's personal A/V apparatus.

FIG. 5B is a flow chart describing another example embodiment of a method for provisioning services through the HMDD 2 of FIG. 1. At step 530, the service consumer enters a command to obtain assistance. See FIG. 10A for an example dialog. Such a command could be entered by a voice command, gesture command, via a touch interface or mechanical interface (e.g., switch) on the HMDD or by other means. In one approach, the command launches an application at the HMDD. The request can alternatively be made by a computing device other than an HMDD, such as a mobile computing device such as a cell phone, tablet, laptop, personal digital assistant, or a fixed computing device such as a desktop/PC computer or game console. At step 532, the service consumer defines the activity and related parameters (e.g., location, fee, rating or other preferences), and submits the request to the service server. See FIG. 10B for an example dialog. The activity could be selected from predefined categories of activities, in one approach, or otherwise defined by the service consumer.

These parameters can be provide by the user via the HMDD at the time of making a request, or beforehand, such as by entering preferences when signing up for the service. The request can include the identifier of the service consumer and this identifier is used to cross-reference to the parameters at the service server, e.g., by providing the database record of FIG. 11A in the database 56 of the service server. The parameters are maintained at the service server such as with a profile of the user, and need not be included in the request in this approach. In another approach, the parameters are maintained at the HMDD or other user computing device and are included with the request.

At step 534, the service server identifies one or more qualified service providers for the activity who also meet the parameters. See FIG. 10B for an example dialog, and FIGS. 11A and 11B for example database records which can be used in this regard. For example, if the activity is car repair, the service server can identify car mechanics or repair facilities which are available to assist the requester, and which meet the fee (e.g., fee not to exceed a certain amount or hourly rate) and rating parameters (rating of good or 3-stars or better out of 5-starts maximum, by other users). A list of mechanics can be filtered based on parameters such as a specified make and model of the car, an expertise level of the mechanic, a preference for a foreign-language speaker, a preference for a male vs. female, and so forth. Location can also be considered. For example, in the case of car repair, the user may follow up a session via the HMDD with an in person visit to the mechanic's shop, so proximity of the shop to the user is a factor. The service server may store information which identifies the days and hours which the service provider is available, and filter the results based on the current time/date of the service consumer's request. The service consumer could also specify that the service is desired at a specified future time/date, and within a specified time/date window. The service consumer could make an appointment with a service provider ahead of time.

At step 536, the service server informs the service consumer of the qualified service providers. Regarding steps 536-542, see FIG. 10B for an example dialog. This approach allows the service consumer to choose from among multiple providers. In another option, only one provider is selected and the service consumer can request another provider if the selected one is not desired. In another option, multiple providers are selected and informed of the request, and whichever responds first to the request can communicate with the service consumer to make an agreement to perform the assistance on acceptable terms. At step 538, the service consumer selects one of the qualified service providers and makes a connection with the service provider, such as calling the service provider via a telephone connection (e.g., land line or cell phone), or via a computer network-based audio channel. At step 540, the service provider receives and accepts the request at a respective computing device. At step 542, the service provider and the service consumer begin a session. The service consumer can speak with the service provider via an established connection. The communication of image and augmented reality data, discussed further below, can occur via the same channel, or a different channel, than the communication of voice data.

In another approach, at step 544, the service server directly connects an identified qualified service provider with the service consumer, without requiring additional action by the service consumer, so there is no need for the service consumer to review and select from among multiple service providers.

In another approach, at step 546, the service provider posts the request as an open request, such as on a web page/site which can be accessed by the general public. In another approach, the web page can only be accessed by registered service providers. Steps for pre-screening the service providers who can access the web page can be taken. In another approach, a request for assistance can be posted on a web page which is accessible to a group of friends or acquaintances of the posting user, such as on a social media web site such as FACEBOOK®. A request for assistance can be communicated to selected people by text message, email or other means. In this case, the matching of providers to receivers is not necessarily performed by the online clearinghouse, and there may be no pre-screening of service providers. A service provider can select any request for assistance for which they believe they are competent, in a self-selection process, and initiate contact with the associated service consumer.

See, e.g., FIGS. 12A and 12B for example user interfaces of a web site. At step 548, the service provider contacts the service consumer to arrange a session and negotiate terms, payment arrangements and so forth, if applicable. The contact can be made by audio/video channels, as discussed.

Figure 6:
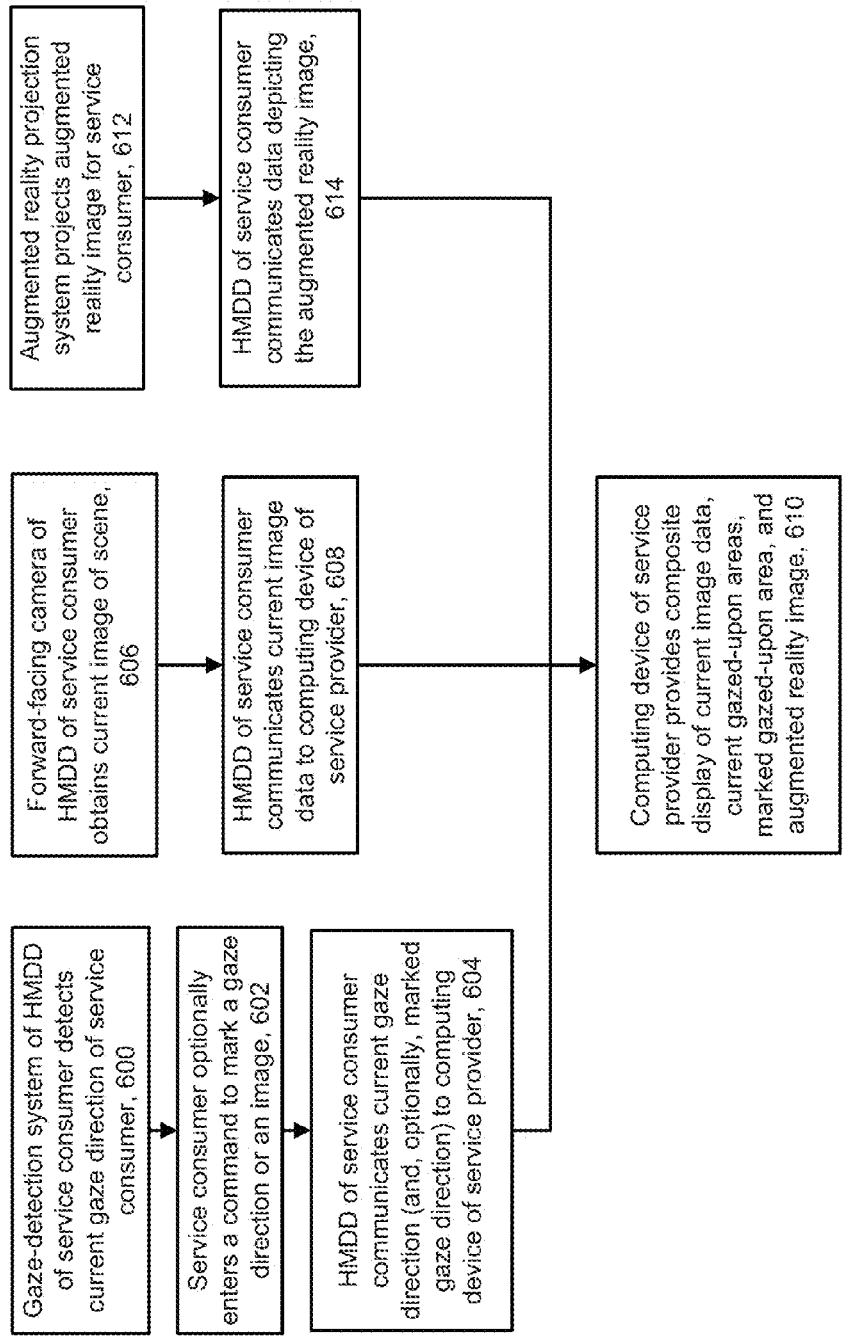
FIG. 6 is a flow chart describing an example embodiment of a method for use in the session of step 540 of FIG. 5B, where data is communicated from the HMDD of the service consumer to the computing device of the service provider.

FIG. 6 is a flow chart describing an example embodiment of a method for use in the session of step 540 of FIG. 5B, where data is communicated from the HMDD of the service consumer to the computing device of the service provider. As an example, three categories of data can be communicated: gaze detection data of the service consumer, as determined by the HMDD of the service consumer, for instance (steps 600, 602 and 604), forward-facing camera data of a physical environment of the service consumer, as determined by one or more cameras of the HMDD of the service consumer, for instance (steps 606 and 608), and augmented reality projection data as provided by a data source of the HMDD of the service consumer (steps 612 and 614). Each of the three branches can be performed repeatedly and in parallel so that updated data is provided substantially in real time. For example, steps 606 and 608 can provide updated images at a video frame rate of many times per second.

Specifically, in the first branch, at step 600, a gaze-detection system of the HMDD of the service consumer detects a current gaze direction of the service consumer. See also FIG. 8 for a gaze detection process and FIG. 9A for example scenarios. For instance, line 907 in FIG. 9A represents a gaze direction of a service consumer 900 toward a cap 912 of a car engine 910. At step 602, the service consumer optionally enters a command to mark or lock a particular gaze direction in an image. For example, in FIG. 9B, the service consumer gazes at an area 956, and the user may enter a spoken command such as "mark gaze" to mark or tag the area 956 for review by the service provider, and/or for later reference or review by the service consumer. In this way, the service consumer can mark one or more areas of concern or interest in a physical environment. The area 956 is optionally highlighted as an augmented reality image by the HMDD of the service consumer. At step 604, the HMDD of the service consumer communicates the current gaze direction and the marked gaze direction to the computing device of service provider. In one option, the marked gaze direction but not the current gaze direction is communicated.

In one approach, the gaze direction is represented by a vector (and the gaze direction data defines the vector) in a coordinate system of the HMDD of the service consumer, and this data can be translated to an area in the camera-captured image of the physical environment, knowing a relationship of a coordinate system of the gaze detection system to a coordinate system of the camera of the HMDD. The area can be visually highlighted by a colored circular region, for instance.

In one approach, the cameras of the HMDD device are depth cameras which can be used to determine a distance between the HMDD and a gazed-upon object in the physical environment. In another approach, the distance is determined as the depth of focus which is based on an eye position (see, e.g., FIG. 8, step 810). This distance data can also be communicated in step 604. Also, the distance data can be used to determine a width of the area 956 of interest, based on an accuracy of the gaze direction system. For example, for a given accuracy, the width of the area of interest can be larger as the distance is greater.

In the second branch, at step 606, the forward-facing camera of the HMDD of the service consumer obtains a current image of a scene, such as a current video frame. At step 608, the HMDD of the service consumer communicates the current image data to the computing device of the service provider. The frame rate can be based on capabilities of the HMDD of the service consumer, the computing device of the service provider and/or a communication network. In some case, it is sufficient to provide one or more fixed images from the HMDD of the service consumer to the computing device of the service provider. In other cases, video is desirable.

In the third branch, at step 612, the augmented reality projection system projects an augmented reality image for the service consumer. At step 614, the HMDD of the service consumer communicates data depicting the augmented reality image to the computing device of the service provider. In one example, the service consumer attempts to perform an activity by referring to instructions which are provided by a local source in an augmented reality image (e.g., local to the service consumer and independent of the service provider). By communicating this augmented reality image to the computing device of the service provider, the service provider can see the instructions that the service consumer is attempting to follow, and provide the appropriate assistance.

At step 610, the computing device of the service provider provides a composite display of the current image data, the current gazed-upon areas, a marked gazed-upon area, and/or the augmented reality image. In this way, the service provider sees everything the service consumer sees. Additionally, an audio channel allows the service provider to hear everything the service consumer hears. For example, for a car repair activity, it may be helpful for the car mechanic to hear the noise of an engine, in addition to speaking with the service consumer.

Figure 7:
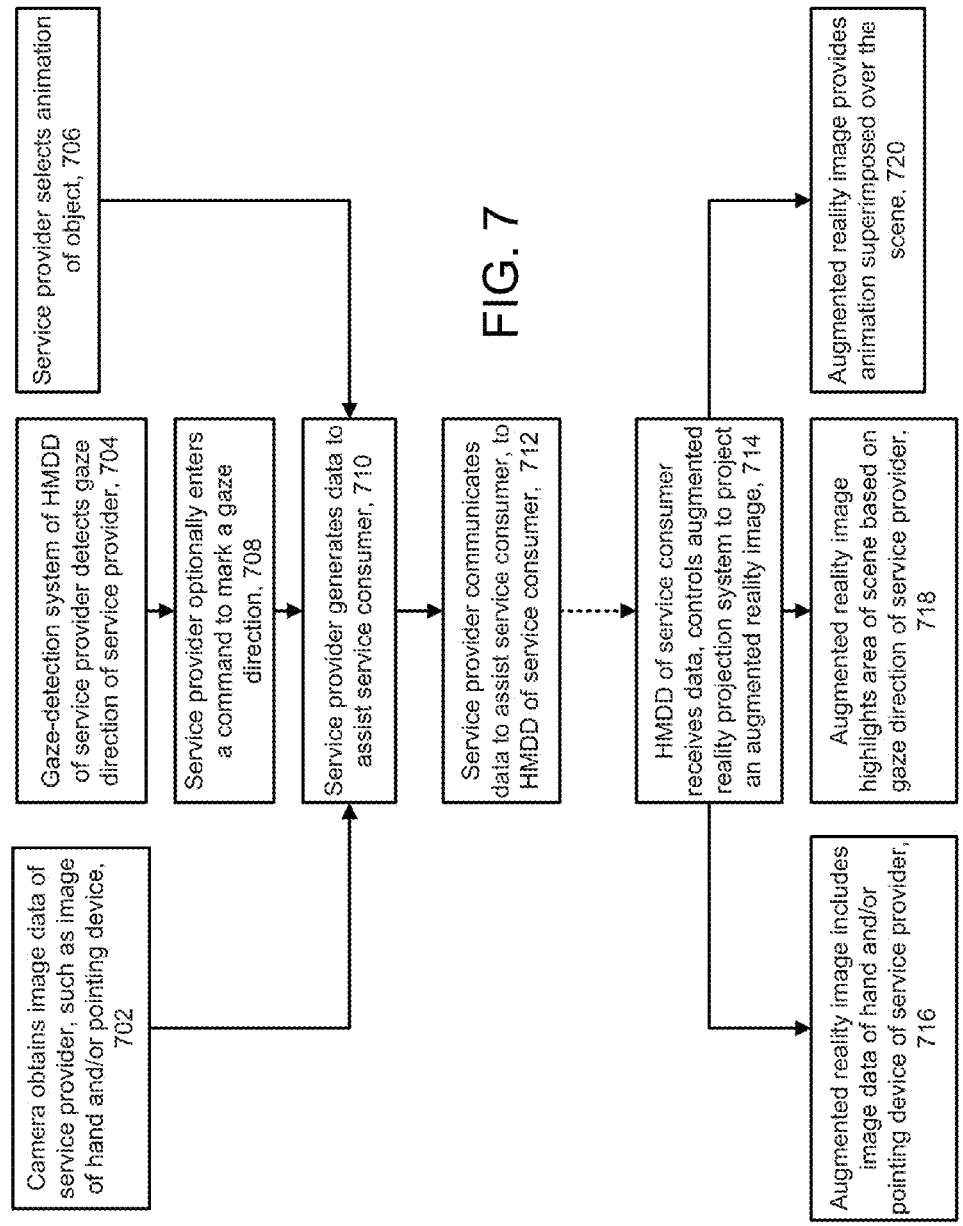
FIG. 7 is a flow chart describing an example embodiment of a method for use in the session of step 540 of FIG. 5B, where data is communicated from the computing device of the service provider to the HMDD of the service consumer.

FIG. 7 is a flow chart describing an example embodiment of a method for use in the session of step 540 of FIG. 5B, where data is communicated from the computing device of the service provider to the HMDD of the service consumer. Three branches are provided which can execute in parallel, for instance. In one branch, a camera is provided to obtain an image of the service provider. The camera can be a forward-facing camera on an HMDD of the service provider, and/or a camera which is otherwise positioned to capture all or part of the service provider and/or his or her physical environment. At step 702, the camera obtains an image of the service provider, such as an image of a hand and/or pointing device. In this situation, the service provider may uses the hand and/or arm, e.g., to gesture or point toward a certain area of a scene in an image to demonstrate a movement or action, or to call the service consumer's attention to the area.

Figure 9A:
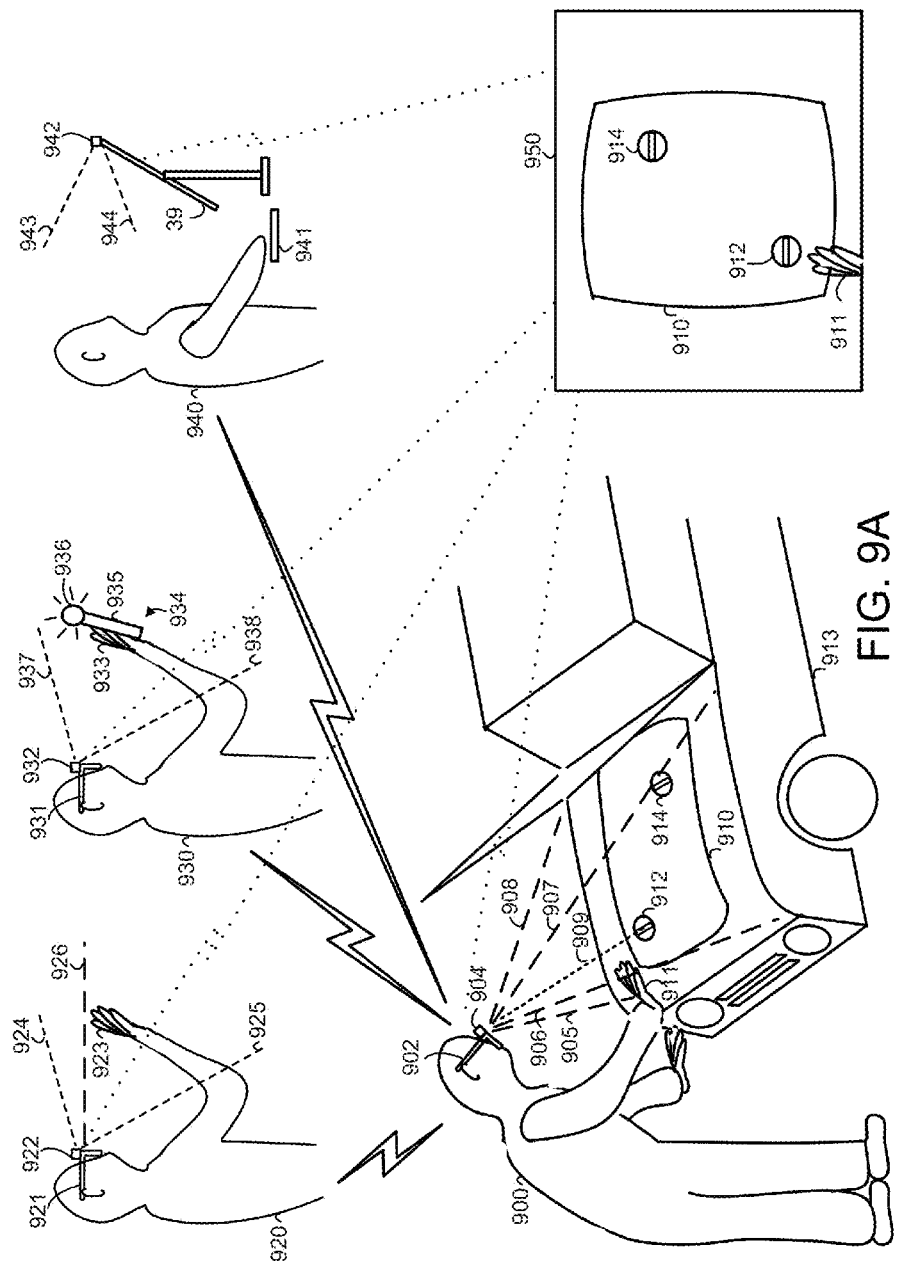
FIG. 9A depicts an example scenario in which a service consumer communicates with a service provider to obtain assistance in performing an activity involving a car engine.
Figure 9E:
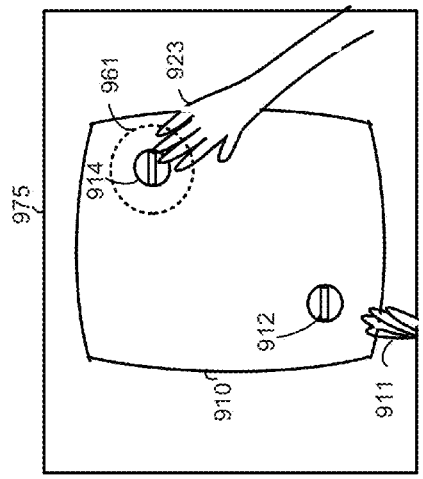
FIG. 9E depicts an image 975 which shows movement of the service provider's hand 923, relative to the position in FIG. 9D1.

For example, in FIG. 9A, a camera 922 of an HMDD 921 captures an image of a hand 923 of a service provider 920. Lines 924 and 925 depict top and bottom boundaries, respectively, of a field of view of the camera 922. The hand 923 is also depicted in the images of FIGS. 9D1 and 9E.

As another example, in FIG. 9B, a camera 932 of an HMDD 931 captures an image of a hand 933 of a service provider 930, where the hand holds a pointing device 934 comprising a handle 935 and a tip 936. The tip can optionally be lighted for better visibility. Lines 937 and 938 depict top and bottom boundaries, respectively, of a field of view of the camera 932.

As another example, in FIG. 9C, a camera 942 with field of view boundaries 943 and 944 captures an image of the service provider 940 and his or her physical environment.

In a second branch, the service provider uses an HMDD. A gaze-detection capability of the HMDD can allow the service provider to provide assistance to the service consumer, such as by gazing at an area of an image and communicating corresponding gaze direction data to the HMDD of the service consumer, to allow projection of an augmented reality image which highlights the area and draws the attention of the service consumer to the area. At step 704, the gaze-detection system HMDD of the service provider detects a gaze direction of the service provider. For example, in FIG. 9A, line 926 is a gaze direction of the service provider 920.

At step 708, the service provider optionally enters a command to mark a gaze direction, such as by a spoken command. At step 710, the service provider generates data to assist the service consumer. This data can comprise the image of step 702, the gaze direction data of steps 704 and 708 and an animation of step 706 (a third branch). Regarding step 706, as discussed, e.g., in connection with FIGS. 9H and 9I, the service provider can select an animation to be displayed to the service consumer as augmented reality images. For example, the animation can demonstrate a movement of an object in the scene which the service consumer should perform. FIGS. 9H and 9I show an animated object as an animation 991 such as a cap to a car engine being rotated counterclockwise to remove the cap from the engine 910. The animation 991 represents the actual cap 914. At step 712, the service provider communicates data to assist the service consumer, to the HMDD of the service consumer.

At step 714, the HMDD of the service consumer receives the data, and, in response, controls the augmented reality projection system to project an augmented reality image. This could include one or more of: the image of step 702, a highlight area of a scene based on gaze direction data of steps 704 and/or 708, and an animation of step 706. For example, at step 716, the augmented reality image includes image data of a hand and/or pointing device of the service provider. As an example, see the hand 923 in FIGS. 9D1, 9D2 and 9E, and the hand 933 in FIG. 9F. At step 718, the augmented reality image highlights an area of a scene based on the gaze direction of service provider. For example, see the highlighted area 961 in FIG. 9C. At step 720, the augmented reality image superimposes an animation over the scene, 720. For example, see the animation 991 in FIG. 9I.

Figure 8:
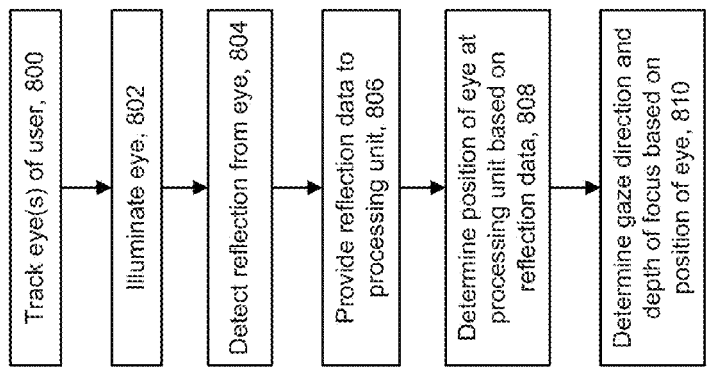
FIG. 8 depicts a process for tracking a user's gaze direction and depth of focus such as for use in step 600 of FIG. 6 and step 704 of FIG. 7.

FIG. 8 depicts a process for tracking a user's gaze direction and depth of focus such as for use in step 600 of FIG. 6 and step 704 of FIG. 7. Step 800 involves tracking one or both eyes of a user using the technology described above. In step 802, the eye is illuminated, e.g., using IR light from several LEDs of the eye tracking camera 134 in FIG. 3A. In step 804, the reflection from the eye is detected using one or more IR eye tracking cameras 134. In step 806, the reflection data is provided to the processing unit 4. In step 808, the processing unit 4 determines the position of the eye based on the reflection data, as discussed above. Step 810 determines a gaze direction and a focal distance.

In one approach, the location of the eyeball can be determined based on the positions of the cameras and LEDs. The center of the pupil can be found using image processing, and a ray which extends through the center of the pupil can be determined as a visual axis. In particular, one possible eye tracking technique uses the location of a glint, which is a small amount of light that reflects off the pupil when the pupil is illuminated. A computer program estimates the location of the gaze based on the glint. Another possible eye tracking technique is the Pupil-Center/Corneal-Reflection Technique, which can be more accurate than the location of glint technique because it tracks both the glint and the center of the pupil. The center of the pupil is generally the precise location of sight, and by tracking this area within the parameters of the glint, it is possible to make an accurate prediction of where the eyes are gazing.

In another approach, the shape of the pupil can be used to determine the direction in which the user is gazing. The pupil becomes more elliptical in proportion to the angle of viewing relative to the straight ahead direction.

In another approach, multiple glints in an eye are detected to find the Sd location of the eye, estimate the radius of the eye, and then draw a line through the center of the eye through the pupil center to get a gaze direction.

The gaze direction can be determined for one or both eyes of a user. The gaze direction is a direction in which the user looks and is based on a visual axis, which is an imaginary line drawn, e.g., through the center of the pupil to the center of the fovea (within the macula, at the center of the retina). At any given time, a point of the image that the user is looking at is a fixation point, which is at the intersection of the visual axis and the image, at a focal distance from the HMDD. When both eyes are tracked, the orbital muscles keep the visual axis of both eyes aligned on the center of the fixation point. The visual axis can be determined, relative to a coordinate system of the HMDD, by the eye tracker. The image can also be defined relative to the coordinate system of the HMDD so that it is not necessary to translate the gaze direction from the coordinate system of the HMDD to another coordinate system, such as a world coordinate system. An example of a world coordinate system is a fixed coordinate system of a room in which the user is located. Such a translation would typically require knowledge of the orientation of the user's head, and introduces additional uncertainties.

If the gaze direction is determined to point at a certain area in a scene, this indicates that the user is looking at the area. In response, the area could be highlighted by generating an auxiliary reality image, for instance. Moreover, the area and an associated object can be recognized by the forward facing camera of the HMDD, using image recognition techniques.

FIG. 9A depicts an example scenario in which a service consumer communicates with a service provider to obtain assistance in performing an activity involving a car engine. As an example, assume the service consumer 900 is working on the engine 910 of a car 913, such as to add oil to the engine. The engine includes a cap 912 for adding windshield washer fluid and a cap 914 for adding oil. In this scenario, the service consumer requests assistance with car repair, to perform the activity of adding oil to the proper reservoir of the engine. The service consumer is wearing an HMDD 902 having a camera 904 which captures an image 950 of the scene, including the engine. A portion of the user's hand 911 is also captured. Lines 905-908 depict boundaries of a field of view of the camera 904. Line 909 depicts the gaze direction. Typically, an augmented reality image can be displayed within a respective field of view which is similar to, smaller than, or larger than, the camera's field of view, based on the respective designs of the augmented reality projection system and camera.

Three examples of service providers are depicted. A first service provider 920 wears an HMDD 921 having a camera 922 with field of view boundaries 924 and 925. A detected gaze direction 926 is determined by the HMDD 921. A second service provider 930 wears an HMDD 931 having a camera 932 with field of view boundaries 937 and 938, and holds, in his or her hand 933, a pointing device 934 comprising a handle 935 and a tip 936 which is optionally lighted for greater visibility. A gaze direction can be detected by the HMDD 931 but is not depicted.

A third service provider 940 does not wear an HMDD, but views images on the display screen 39 (which is a table top monitor/PC in this example, but could be a screen of a mobile device as well), and uses an input device 941 such as a mouse to provide control inputs/commands to the monitor/PC. A gaze direction can be detected by the camera 942, for instance. Recall that the service provider can be located remotely from the service consumer, but communicates with the service consumer in a session to see what the service consumer is doing and to assist the service consumer in some activity. The camera 942 views the service provider 940 in a field of view with boundaries 943 and 944. Camera-captured images of the face of the service provider 940, and/or of the service provider 940 gesturing or manipulating some object, can thus be provided to the service consumer, such as depicted in FIG. 9J. This can help in the communication process and personalize the experience.

The image 950 represents what the service consumer sees directly in the user's physical environment. The image 950 also represents what the service provider sees as an augmented reality image of the HMDD 921 and 931 or as an image on the display screen 39. This image is obtained as image data from the camera 904.

The third service provider 940 could both wear an HMDD and view images on a display screen while using an input device such as a mouse to provide control inputs.

The service providers can be part of a help desk service.

FIG. 9B depicts an image 955 which is based on the image 950 of FIG. 9A, with the addition of an augmented reality image which highlights a first area 956 of the scene. The image 955 can represent what the service consumer sees directly in the user's physical environment (e.g., the car engine 910, hand 911 and caps 912 and 914), with the highlighted first area 956 displayed to the service consumer as an augmented reality image using the HMDD 902. For example, the highlighted first area 956 can be a current gazed-upon area of the scene as determined by the gaze detection system of the HMD 902. Or, the highlighted first area 956 could be a marked gazed-upon area. The image 955 can also represent what the service provider sees as an augmented reality image of the HMDD 921 or 931 or as an image on the display screen 39. In this case, the service provider can see from the highlighted area 956 that the service consumer is gazing at the wrong cap for adding oil. The service consumer is gazing at the windshield washer fluid cap 912 instead of the oil reservoir cap 914. In this scenario, once connected by an audio channel, the service provider has spoken with the service consumer to learn that the service consumer desires to add oil to the engine. Note that a highlight can have different forms. A circular highlight of a certain color which has good contrast (an example is bright yellow) may be used. The highlight can be static, time-varying (e.g., flashing) or moving. An example highlight could have the shape of a pointer such as an arrow which points at a certain area. Image data of the scene near the area to be highlighted can be processes to determine optimal visual characteristics of the highlight. For example, a brightness of the highlight can be set based on a brightness of the nearby scene. The highlight should be a specified degree brighter than the nearby scene, in one approach. A color of the highlight can be set to be contrasting from a color or colors of the nearby scene. The highlight can have a degree of transparency which allows the service consumer to see the physical environment (e.g., the cap 912) behind the highlight, when the highlight is superimposed over the area of interest.

FIG. 9C depicts an image 960 which is based on the image 950 of FIG. 9A, with the addition of an augmented reality image which highlights a second area 961 of the scene. In response to seeing that the service consumer is gazing at the wrong cap for adding oil, the service provider can provide the highlighted second area 961 which is superimposed over with the position of the cap 914. The service provider can provide the highlighted second area 961 in various ways. In one way, the service provider purposefully gazes (looks) at the cap 914 and enters a command to mark the gaze direction. In response, the marked gaze direction is translated to the highlighted second area 961 becomes visible to both the service provider and the service consumer, e.g., at substantially the same time. In one approach, the highlighted second area 961 becomes visible only to the service provider initially, and the service provider enters a further command to transmit data to the HMDD of the service consumer to make the highlighted second area 961 visible there, after confirming that the highlight is accurate.

In another way provide the highlighted second area 961, the service provider 920 gestures with a hand 923 such as in FIG. 9D1, the hand is recognized by image recognition software which operates on an image of the hand captured by the camera 922, and the highlighted second area 961 is provided based on the recognized location of the hand. For example, the highlighted second area 961 can be provided as a circle centered at a location of a tip of the hand, or at a location of a fingertip, if the service providing-user points to the cap 914.

In another way provide the highlighted second area 961, the service provider 930 gestures with the pointing device 934, the tip 936 of the pointing device 934 is recognized by image recognition software which operates on an image of the pointing device 934 captured by the camera 932, and the highlighted second area 961 is provided based on the recognized location of the tip. For example, the highlighted second area 961 can be provided as a circle centered at a location of the tip 936.

In another way provide the highlighted second area 961, the service provider 940 uses the input device 941 to position a cursor over a region of the cap 914 on the display screen 39 and enter a further command such as a mouse click to mark the position. The highlighted second area 961 is then provided at the marked position. Or, if the display screen 39 is touch sensitive, the service provider 940 can touch a portion of the screen which marks the desired position of the highlight.

Thus, the image 960 can represent what the service provider sees as an augmented reality image of the HMDD 921 or 931 or as an image on the display screen 39. The image 960 can also represent what the service consumer 900 sees directly in their physical environment, with the highlighted first area 961 displayed to the service consumer as an augmented reality image using the HMDD 902.

FIG. 9D1 depicts an image 965 which is based on the image 960 of FIG. 9C, with the addition of an image of the service provider's hand 923 of FIG. 9A in a first position. The camera 922 of the HMDD 921 captures an image of the hand 923 of the service provider 920, and this image is communicated to the HMDD 902 of the service consumer, for display as an augmented reality image. The image 965 as seen by the service provider (as well as any of the images such as 950, 960, 975, 980, 985, 990, 998 and 999) can be 3d such that the service provider 920 can reach out to apparently touch a portion of the scene, e.g., cap 914, and this action can be communicated to the service consumer.

The image 965 can represent what the service consumer sees in the their physical environment, with the highlighted first area 961 and the hand 923 displayed to the service consumer as an augmented reality image using the HMDD 902. The image 965 can also represent what the service provider sees as his or her hand in a physical environment, with the addition of the highlighted first area 961 as an augmented reality image of the HMDD 921 and 931 or as an image on the display screen 39. In one approach, a portion of the highlighted first area 961 appears to the service provider to be in front of the hand 923. In another approach, this is avoided by the HMDD detecting the position of the hand and controlling the augmented reality image of the highlighted first area 961 so that a portion of the highlighted first area 961 which intersects with a field of view of the hand 923 is turned off.

FIG. 9D2 depicts an augmented reality image 970 of the service provider's hand 923 and the highlighted second area 961 in isolation. For the service consumer to see the image of FIG. 9D1, the computing device of the service provider communicates the image 970 of the hand 923 and data for generating the second highlighted area 961 to the HMDD 902 of the service consumer. The HMDD generates the augmented reality image 970 so that it is superimposed over the user's view of the physical environment (image 950 in FIG. 9A), to obtain the image 965 of FIG. 9D1. Although the hand 923 is in a physical environment and is captured by a camera at the service providers' location, the camera image is converted to an augmented reality image which can be 2d or 3d, for use by the service consumer's HMDD. In contrast, the second highlighted area 961 does not exist in any physical environment. Instead, it exists only in a virtual environment as an augmented reality image.

The physical environment of the service provider may be configured so that extraneous objects are not captured by the camera 922 or 932. To this end, the camera and the service provider may face a neutral area such as a blank wall.

FIG. 9E depicts an image 975 which shows movement of the service provider's hand 923, relative to the position in FIG. 9D1. In this case, the augmented reality images comprises a sequence of images which identify a sequence of hand movements of the service provider which is superimposed over the scene. The service provider 920 can move the hand 923 to demonstrate a counterclockwise twisting motion which the service consumer 900 should perform to remove the cap 914. This explains to the service consumer how to grab the cap 914 and twist it. Thus, movement of an object in a scene can be demonstrated and not merely identification of an object.

The image 975 can represent what the service consumer sees in the user's physical environment, with the highlighted second area 961 and the hand 923 displayed to the service consumer as an augmented reality image using the HMDD 902. The image 975 can also represent what the service provider sees as his or her hand in a physical environment, with the addition of the highlighted second area 961 as an augmented reality image of the HMDD 921 or 931 or as an image on the display screen 39.

Figure 9G:
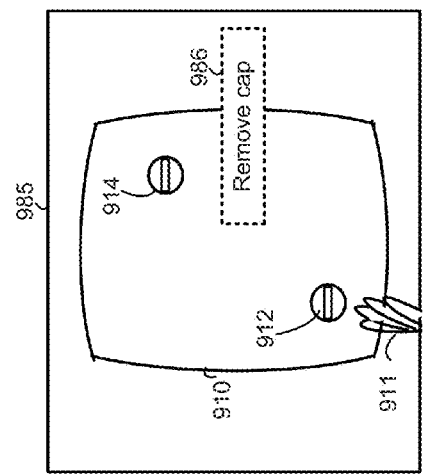
FIG. 9G depicts an image 985 which is based on the image 950 of FIG. 9A, with the addition of augmented reality image 986 which provides instructional text.
Figure 9F:
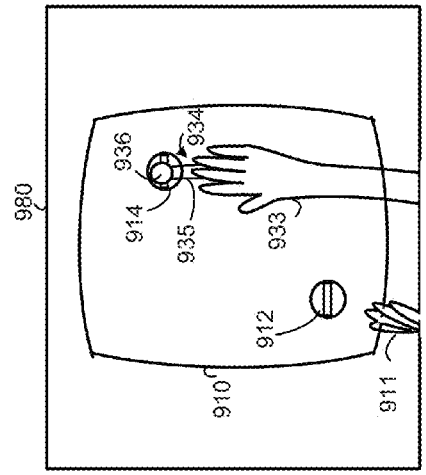
FIG. 9F depicts an image 980 which is based on the image 960 of FIG. 9C with an image of the service provider's hand 933 and pointing device 934 of FIG. 9A.

FIG. 9F depicts an image 980 which is based on the image 960 of FIG. 9C with an image of the hand 933 of the service provider 930, along with the pointing device 934 having a handle 935 and a tip 936 (see FIG. 9A). A pointing device can make it easier for the service provider to point out areas of a scene without their body getting in the way. Additionally, a lighted tip is highly visible.

FIG. 9G depicts an image 985 which is based on the image 950 of FIG. 9A, with the addition of augmented reality image 986 which provides instructional text. In one approach, instructional or other text can be generated at the HMDD of the service consumer and communicated to the computing device of the service provider. By communicating this augmented reality image to the computing device of the service provider, the service provider can see the instructions that the service consumer is attempting to follow, and provide the appropriate assistance. In another approach, text is generated at the computing device of the service provider and communicated to the HMDD of the service consumer. Both approaches can be used at the same time as well. For example, the service provider may generate text in the image 986 (using a keyboard, voice recognition or other input device) of "remove cap," which is communicated as augmented reality data to the HMDD of the service consumer.

The image 985 can represent what the service consumer sees in the user's physical environment, with the text in the image 986 displayed to the service consumer as an augmented reality image using the HMDD 902. The image 985 can also represent what the service provider sees as an augmented reality image of the HMDD 921 or 931 or as an image on the display screen 39.

FIG. 9H depicts images 950 and 990 on the display device 39 of FIG. 9A which allow the service provider 940 to select an animation 991 as an augmented reality image. In one example, the image 950 of FIG. 9A is on the right as one display area, and another image 990 is on the left as another display area. The image 990 allows the service provider 940 to select an animation as an augmented reality image. In another approach, the image 990 is a separate window within the image 950.

It can be useful for the service provider to access the content library 43 of FIG. 1 to select an animation or other image to communicate to the HMDD of the service consumer. One example is an animation of the cap 914 being rotated counterclockwise, in the removal direction, to demonstrate to the service consumer the necessary steps to perform the desired activity. The image 990 displays a selected animation 991. An animation or still image can be selected by the service provider from the content library, which may be organized according to activity, task, or other ways. Such animations can be developed beforehand based on commonly assisted activities. For example, for a car mechanic, commonly assisted activities may include adding oil to the engine and changing a tire. The service provider can position the selected animation 991 at a default position or at a selected position within the image 950, e.g., using a dragging motion represented by the arrow.

In one approach, the content library is local to the service provider's computing device, and the animation is accessed from the content library and communicated from the service providing user's computing device to the service consumer's HMDD as augmented reality data. In another approach, the content library is accessed by the service providing user's computing device via a remote server such as a web server (e.g., the service server 24 or other server), via a connection between the service providing user's computing device and the remote server. This connection can be separate from the connection between the service providing user's computing device and the service consumer's HMDD. The animation can be downloaded from the server to the service providing user's computing device, then communicated from the service providing user's computing device to the service consumer's HMDD. Or, a reference to the animation such as a URL or other network address can be communicated from the service providing user's computing device to the service consumer's HMDD, in response to which the service consumer's HMDD accesses the animation (directly or via another local computing device such as the hub computing system 12) using the network address and accesses the animation.

The animation can have any shape, and can be 2d or 3d. The animation can represent movement of a rigid body object, such as rotation or translation, and/or movement of portions of an object. The animation can include visual effects such as color coding as well as accompanying pre-recorded audio. The animation may or may not appear within a separate window. The animation can be a video. The animation can be in one or more files. The animation can be streamed to the service consumer's HMDD or downloaded and then played. The service consumer may start, stop, play back, reduce, enlarge and otherwise control the animation by commands. In some cases, the service provider has the ability to control the playing of the animation by commands.

FIG. 9I depicts an image 998 with the animation of FIG. 9H. This image represents the image 950 after adding the animation 991. The image 998 can represent what the service consumer 900 sees in the user's physical environment, with the animation 991 displayed to the service consumer as an augmented reality image using the HMDD 902. The image 998 can also represent what the service provider sees as an augmented reality image of the HMDD 921 or 931 or as an image on the display screen 39.

FIG. 9J depicts an image 999 which is based on the image 950 of FIG. 9A, with the addition of an image 996 of the service provider in an inset window 997. The image 996 of the service provider 940 can be captured by the camera 942 of FIG. 9A, for instance. This can help in the communication process and personalize the experience. An image of the service consumer could also be display to the service provider, where the image is from a database record or captured in real time.

Figures 10A, 10C:
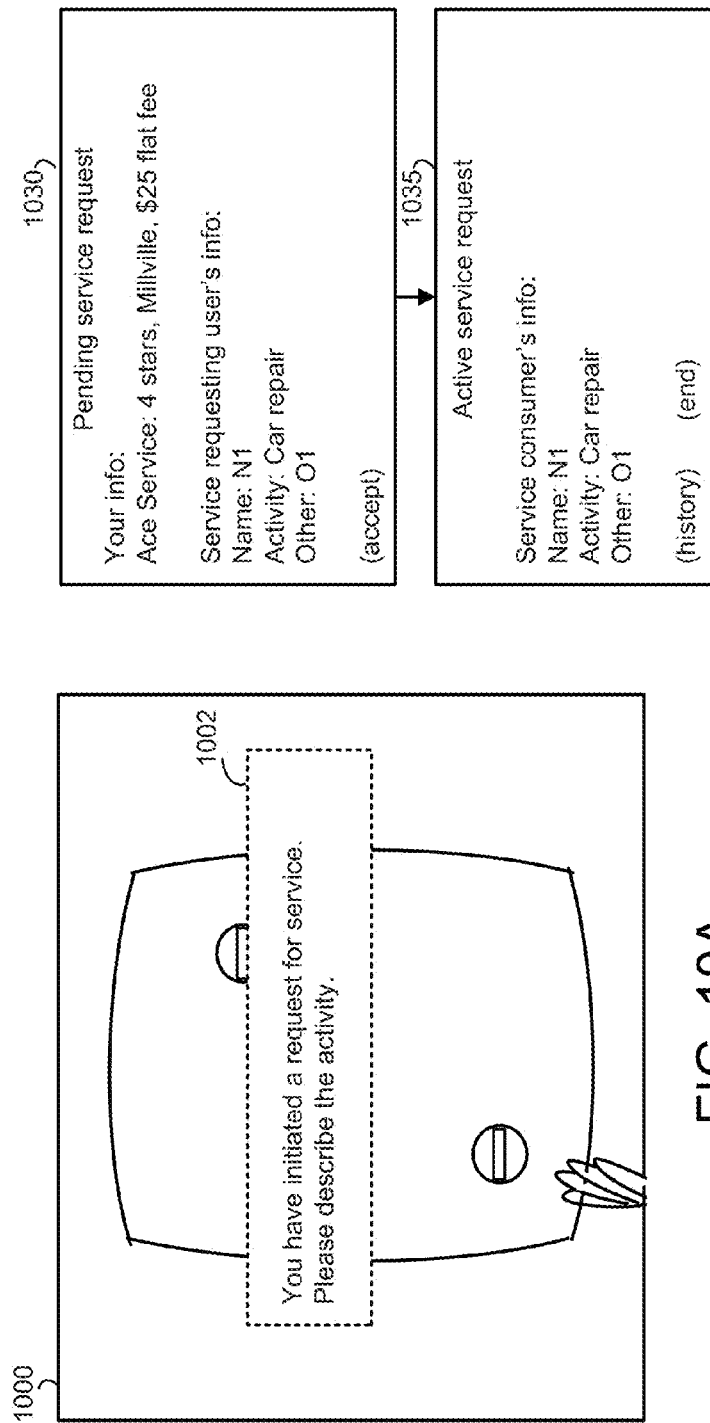
FIG. 10A depicts an image 1000 which is obtained by adding to the image 950 of FIG. 9A, an augmented reality text dialog 1002 by which a service consumer initiates a request for assistance in performing an activity, in accordance with step 530 of FIG. 5B.
FIG. 10C depicts an example augmented reality text dialog 1030 and 1035 by which a service provider accepts a request to give assistance to a service consumer, in accordance with step 540 of FIG. 5B.

FIG. 10A depicts an image 1000 which is obtained by adding to the image 950 of FIG. 9A, an augmented reality text dialog 1002 by which a service consumer initiates a request for assistance in performing an activity, in accordance with step 530 of FIG. 5B. As an example, an application is launched at the HMDD when the user speaks a command, resulting in the dialog 1002 ("You have initiated a request for service. Please describe the activity.") The activity may or may not be selected from predefined categories of activities.

Figure 10B:
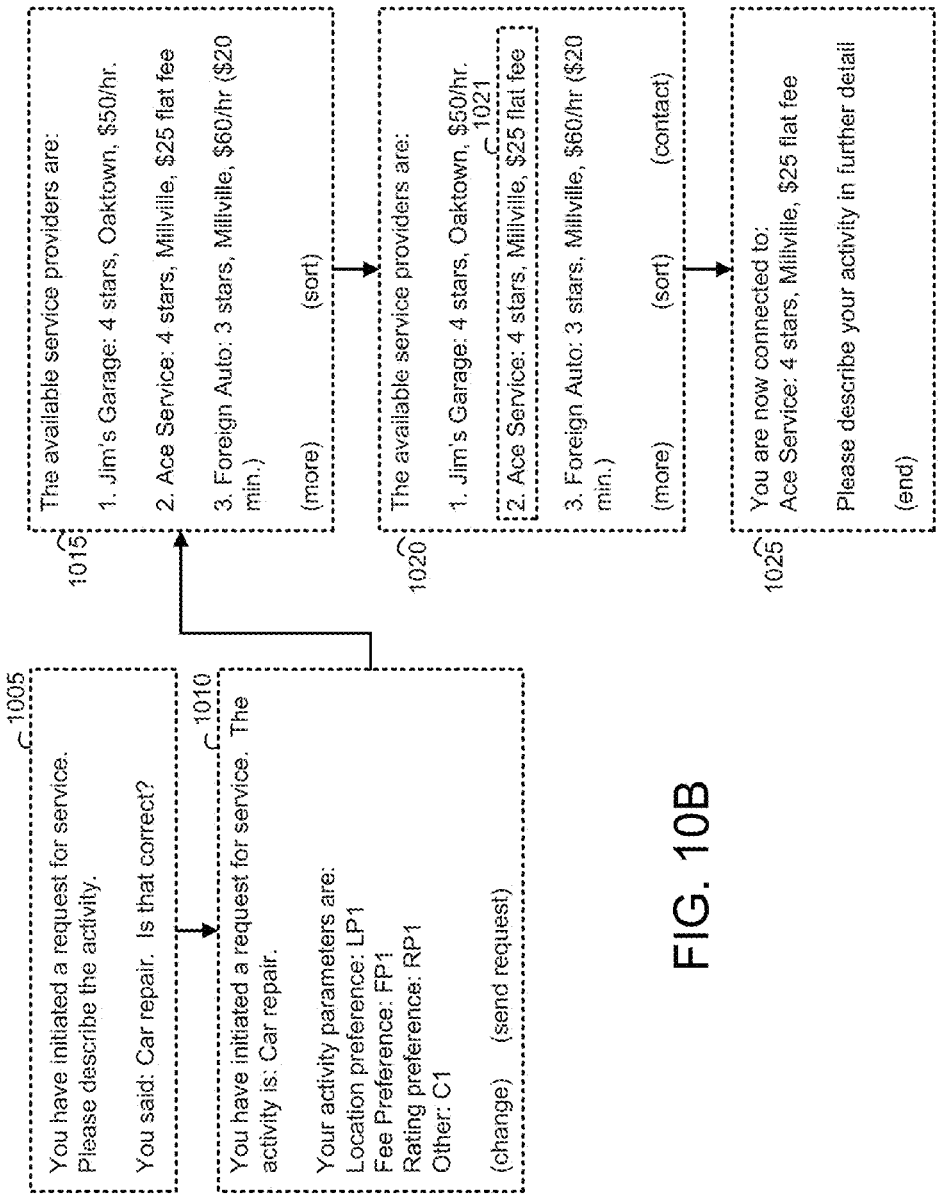
FIG. 10B depicts an additional augmented reality text dialog 1005, 1010, 1015, 1020 and 1025 which follows the dialog of FIG. 10A.

FIG. 10B depicts an additional augmented reality text dialog 1005, 1010, 1015, 1020 and 1025 which follows the dialog of FIG. 10A. The service consumer responds to the dialog 1002 of FIG. 10A by speaking "Car repair." The application recognizes the response, such as by speech to text conversion, and repeats the response in dialog 1005 (adding "You said: Car repair. Is that correct?" to the dialog of 1002). The service consumer responds by speaking "yes." The application recognizes the response, and provides the dialog 1010, adding "Your activity parameters are: Location preference" LP1, Fee preference: FP1, Rating preference" RP1, Other: C1, (change) and (send request)," in accordance with step 532 of FIG. 5B. The HMDD can look up the parameters from a local or remote source. In one approach, the HMDD communicates with the service server 24 (FIG. 1) to obtain the parameters. The HMDD can communicate an identifier and optionally the activity description which it uses to cross-reference to the parameters. The parameters can be pre-configured by the user or set as default values. The parameters can indicate terms which the user wishes to have considered in selecting an appropriate service provider. For instance, the location preference (e.g., a zip code, city name) can indicate that a service provider located in a certain city or neighborhood is desired. A fee preference can indicate a maximum fee (e.g., amount or hourly rate) that the service provider desires. A rating preference can indicate a rating (e.g., a three or four star-rated mechanic) that the service provider desires. If a maximum fee is indicated by the service consumer, this information may be concealed from the service provider to protect the service consumer.

The parameters can also provide information about the service consumer that the service server may find helpful in matching the service consumer to a service provider, and/or that the service provider can use to better assist the service consumer, such as the preference for a foreign-language speaker, a preference for a male vs. female, a group affiliation of the service consumer, and so forth.

The text "(change)" informs the user that they can change the parameters, and the text "(send request)" informs the user that they send the request once it is ready, such as by a spoken command. In one approach, the request is sent to the service server, where one or more appropriate service providers are identified, e.g., using the database record 1050 of FIG. 11A, and in accordance with step 534 of FIG. 5B. In one approach, the service server sends data identifying the selections to the HMDD to be displayed as augmented reality images, for instance, in accordance with step 536 of FIG. 5B. The dialog 1015 states: "The available service providers are: 1. Jim's Garage: 4 stars, Oaktown, $50/hr., 2. Ace Service: 4 stars, Millville, $25 flat fee, 3. Foreign Auto: 3 stars, Millville, $60/hr ($20 min.), (more), (sort)." Brief relevant information is provided for each of three service providers, such as name, rating, location (city name) and fee amount, to allow the user to select one of them. Note that a name of an organization such as company can represent one or more associated service providers of the organization. In some cases, both an organization name and a person's name are provided.

The text "(more)" informs the user that they can view additional service providers, and the text "(sort)" informs the user that they can enter a command to sort the selections such as by rating (e.g., highest to lowest), location (e.g., closest to furthest) or fee (e.g., lowest to highest).

The service consumer can select one of the service providers such as by a spoken command, in response to which the selection is highlighted, e.g., by a box 1021 in dialog 1020, in accordance with step 538 of FIG. 5B. The second entry, "Ace Service: 4 stars, Millville, $25 flat fee" is selected. In response to this selection, the text "(contact)" appears in the dialog 1020, informing the service consumer that they can initiate contact with the selected service consumer by entering a corresponding command.

The dialog 1025 is reached such as when the user enters a spoken command. The dialog 1025 states: "You are now connected to: Ace Service: 4 stars, Millville, $25 flat fee, Please describe your activity in further detail, (end)." In one approach, the initial contact is made by voice only between the HMDD or other computing device of the service consumer and the computing device of the service provider, such as to allow the users to ask questions and establish that a session involving the exchange of image and augmented reality data should occur. Once this is established, the service provider can enter a command to begin the session. The service provider may direct the session by requesting that the service consumer take a certain position within the scene, look in a certain direction, and perform certain actions, for instance. The users can speak to one another during the session to optimize the experience.

The text "(end)" informs the service consumer that they can end the session by entering a corresponding command.

In another approach, according to step 544 of FIG. 5B, the service server directly connects the service consumer to a service provider so that dialogs 1015 and 1020 are skipped.

Alternatively, the service consumer can set up a session with a service provider using a computing device other than an HMDD, e.g., using a cell, phone table or PC. A session using the HMDD can then begin at an agreed upon time by either the service consumer initiating contact with the service provider using the HMDD, or the service provider initiating contact with the service consumer.

FIG. 10C depicts an example augmented reality text dialog 1030 and 1035 by which a service provider accepts a request to give assistance to a service consumer. One or more service providers may be contacted by the service server or by a service consumer (directly or via the service server or other intermediate computing device) when there is a pending service request. For example, the dialog 1030 may appear on the computing device of the service provider "Ace Service" when the "(contact)" command of dialog 1020 (FIG. 10B) is selected. The dialog states: "Pending service request, Your info: Ace Service: 4 stars, Millville, $25 flat fee, Service consumer's info: Name: N1, Activity: Car repair, Other: O1, (accept)". The dialog thus includes the description of the activity, i.e., car repair, as well as information about the service consumer. The text "(accept)" informs the service provider that they can enter a command to accept the request and begin communicating with the service consumer, in dialog 1035, in accordance with step 540 of FIG. 5B.

The dialog 1035 states: "Active service request, Service requester's info:, Name: N1, Activity: Car repair, Other: O1, (history), (end)." The service provider and service consumer are now in a session, in accordance with step 542 of FIG. 5B. The text "(history)" informs the service provider that they can enter a command to obtain additional information about the service consumer such as a history of prior sessions and an account status of the user. This additional information could also be accessed before the service provider accepts the request. By the command "(end)," the service provider can end the dialog.

In one approach, the pending service request includes images communicated by the service consumer to better describe the activity for which assistance is requested.

FIG. 11A depicts an example data record 1050 of the database 56 of the service server 24 of FIG. 1 for service consumers. The record has an entry or line for each service consumer. Example data fields include an identifier of the service consumer (e.g., an account number or user id), a name of the service consumer (e.g., an organization or individual name), contact info (e.g., phone number and network address such as an IP address—which may be updated to reflect a current IP address at the time of the service consumer providing a request), a location parameter (indicating a desired location of a service provider, e.g., city names and zip codes), a fee parameter (indicating a maximum desired fee—an amount or rate—that the service consumer will pay for the assistance), a rating parameter (indicating a desired minimum rating of a service provider), and other (e.g., other information about the user or the user's activities, an image of the user, language or gender preferences). The identification of the service consumer is associated with each of the respective parameters.

This is a simplified example. In another example, the parameters are different for different activities. For example, the service consumer may set a different fee amount based on the type of activity for which assistance is desired.

FIG. 11B depicts an example data record 1060 the service server 24 of FIG. 1 for service providers. The record has an entry or line for each service provider. Example data fields include an identifier of the service provider (e.g., an account number or user id), a name of the service provider (e.g., an organization or individual name), a location preference (e.g., city names and zip codes which are served), fee preference (minimum amount or rate which is acceptable), and other (other information about the user, an image of the user, language capabilities). The data record 1060 can identify trained people, organized by skill type and level of skill, education level or certifications, indicating how much they charge, locations they serve, ranking by other service consumers, and so forth. The providers could be prescreened by an operator of the service server 24 in terms of verifying licenses and other credentials, performing criminal background checks, and checking a status with the Better Business Bureau or other consumer protection groups.

In matching service consumers to service providers, various techniques can be used. In one approach, a ranking is provided for each service provider relative to a given request of a service consumer. The highest ranked service provider can then be provided to the service provider for selection. In another approach, the service consumer is automatically connected to the first available and qualified service provider. Some degree of randomness can be used. In another approach, the service consumer indicates a preference for a certain service provider in relation to a particular activity (e.g., service provider A is desired for activity A, service provider B is desired for activity B, and so forth). The service consumer could also indicate a ranked preference for multiple service providers in relation to a particular activity (e.g., service provider A is first desired for activity A, service provider B is second desired for activity A, and so forth.) These preferences can be stored in the record 1050.

FIG. 12A depicts an example user interface 1070 which allows service providers to contact service consumers. For example, a list of requests can be provided, where each entry includes a request identifier, a description, e.g., as provided by the service consumer, and contact info, location, fee and other parameters of the request which are specific to the service consumer. A "contact" button next to each entry can be selected to initiate contact, e.g., by telephone or other audio channel, and/or by a video channel, with the service consumer. A "filter" button can be selected to filter the entries, such as to select only entries of a desired type. A pop-up window can be displayed which allows the user to enter a term as a filter criterion. The service provider could also click on each heading to sort the entries by that heading. In one approach, a request includes images communicated by the service consumer to better describe the activity for which assistance is requested.

FIG. 12B depicts another example user interface 1080 which allows service providers to contact service consumers, where a list of requests is filtered by the service provider. In this case, the entries are filtered so that only those relating to car repair are displayed. This allows the service provider to quickly identify requests of interest and to initiate contact with the associated service consumer.

The example computer systems illustrated in the figures include examples of computer readable storage media. Computer readable storage media are also processor readable storage media. Such media may include volatile and nonvolatile, removable and non-removable media implemented in any method or technology for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used to store the desired information and which can accessed by a computer.

The above discussion describes many different ideas. Each of these ideas can be combined with the other above-described ideas such that a personal A/V apparatus and accompanying system can be designed to implement all of the ideas discussed above, or any subset of the ideas.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for use of head-mounted display device worn by a service consumer, the method comprising:
   receiving image data of a scene from at least one forward-facing camera;
   obtaining gaze direction data, the gaze direction data indicating a gaze direction of the service consumer;
   controlling an augmented reality projection system to provide an augmented reality image which highlights one area in the scene corresponding to the gaze direction of the service consumer;
   receiving a command from the service consumer to mark the gaze direction as a marked gaze direction; and
   in response to the command, communicating the image data of the scene with the augmented reality image which highlights the one area in the scene to a computing device of a service provider, the service provider generating data to assist the service consumer in performing an activity in the scene;

receiving the data generated by the service provider; and controlling the augmented reality projection system based on the data generated by the service provider to project an additional augmented reality image to the service consumer which highlights another area in the scene, to assist the service consumer in performing the activity.

2. The method of claim 1, wherein:
the gaze direction data indicates gaze directions of the service consumer; and
the augmented reality projection system provides augmented reality images which highlight areas in the scene corresponding to the gaze directions of the service consumer; and
the command from the service consumer marks one of the gaze directions as the marked gaze direction.

3. The method of claim 1, wherein:
the data generated by the service provider includes gaze direction data of the service provider; and
the augmented reality projection system is controlled to provide at least one augmented reality image which highlights an area in the scene corresponding to the gaze direction data of the service provider.

4. The method of claim 1, wherein:
the data generated by the service provider comprises a sequence of images of hand movements of the service provider; and
the augmented reality projection system is controlled to provide the sequence of images of hand movements of the service provider as a sequence of augmented reality images superimposed over the scene.

5. The method of claim 4, wherein:
the sequence of augmented reality images superimposed over the scene comprises the additional augmented reality image which highlights another area in the scene.

6. The method of claim 1, further comprising:
in response to a command by the service consumer, communicating a request for assistance in performing the activity to a service server, the request identifies the activity and comprises an image which describes the activity.

7. The method of claim 1, further comprising:
in response to a command by the service consumer, communicating a request for assistance in performing the activity to a service server, the request identifies the activity and comprises an image which describes the activity, and the request is made available to a plurality of service providers;
pursuant to the request, receiving data from the service server identifying the plurality of service providers;
controlling the augmented reality projection system to project at least one augmented reality image to the service consumer which identifies the plurality of service providers; and
in response to a command by the service consumer selecting one of the service providers, establishing a connection with the one of the service providers.

8. The method of claim 1, wherein:
setting a brightness of the augmented reality image which highlights the one area in the scene to be higher than a brightness of the scene.

9. The method of claim 1, wherein:
setting a color of the augmented reality image which highlights the one area in the scene to contrast with a color of the scene.

10. The method of claim 1, further comprising:
setting a degree of transparency of the augmented reality image which highlights the one area in the scene to allows the service consumer to see the one area behind the augmented reality image which highlights the one area.

11. A computing device of a service provider, the computing device comprising:
a display device;
a communication interface;
an eye tracking camera; and
at least one control circuit in communication with the display device, the communication interface and the eye tracking camera, the at least one control circuit is configured to:
receive image data of a scene from a head-mounted display device worn by a service consumer, via the communication interface, the image data is obtained from at least one forward-facing camera of the head-mounted display device worn by the service consumer;
control the display device to display at least one image to the service provider, the at least one image depicts the scene;
receive a command from the service provider which identifies an area in the scene which the service provider calls to an attention of the service consumer;
in response to the command, generate data to assist the service consumer in performing an activity;
communicate the data to assist the service consumer in performing the activity to the head-mounted display device worn by the service consumer, via the communication interface, the data to assist the service consumer in performing the activity is configured to be used to project to the service consumer via the head-mounted display device worn by the service consumer, at least one augmented reality image which highlights the area in the scene;
obtain gaze direction data of the service provider from the eye tracking camera, the gaze direction data identifies the area in the scene; and
communicate the gaze direction data to the head-mounted display device worn by the service consumer.

12. The computing device according to claim 11, further comprising:
a forward-facing camera which captures a sequence of images of movement of a hand of the service provider, the at least one control circuit is configured to communicate the sequence of images of the movement of the hand to the head-mounted display device worn by the service consumer.

13. The computing device according to claim 11, wherein:
the at least one control circuit is configured to receive gaze direction data from the head-mounted display device worn by the service consumer, the gaze direction data from the head-mounted display device worn by the service consumer indicates another area in the scene, and to superimpose a highlight of the another area in the scene on the at least one image which depicts the scene.

14. A method for assisting a service consumer wearing a head-mounted display device, the method comprising:
communicating a request for assistance in performing an activity to a service server, the request includes an identification of the activity and an image which describes the activity, and the request is made available to a pool of qualified service providers;

in response to at least one service provider of the pool of qualified service providers accepting the request, communicating with the at least one service provider via the head-mounted display device, the communicating comprises communicating image data from a forward-facing camera of the head-mounted display device to a computing device of the at least one service provider, and receiving data generated by the at least one service provider to assist the service consumer in performing the activity; and controlling an augmented reality projection system based on the data generated by the at least one service provider to project at least one augmented reality image to the service consumer, to assist the service consumer in performing the activity.

15. The method of claim 14, wherein:

the communicating with the at least one service provider comprises communicating gaze direction data from the head-mounted display device to a computing device of the at least one service provider, the gaze direction data indicates an area in a scene at which the service consumer gazes.

16. The method of claim 14, wherein:

the request includes an identification of the service consumer; and the identification of the service consumer is associated with a fee parameter indicating a maximum desired fee that the service consumer desires to pay for the assistance.

17. The method of claim 14, wherein:

the request includes an identification of the service consumer; and the identification of the service consumer is associated with a location parameter indicating a desired location of a service provider.

18. The method of claim 14, wherein:

the request includes an identification of the service consumer; and the identification of the service consumer is associated with a rating parameter indicating a desired minimum rating of a service provider.

19. The method of claim 14, further comprising:

pursuant to the request, receiving data from the service server identifying the at least one service provider; and based on the data, controlling the augmented reality projection system of the head-mounted display device to project at least one augmented reality image to the service consumer which identifies the at least one service provider.

* * * * *